(12) United States Patent
Chung

(10) Patent No.: US 11,748,023 B2
(45) Date of Patent: Sep. 5, 2023

(54) DATA STORAGE DEVICE AND NON-VOLATILE MEMORY CONTROL METHOD

(71) Applicant: Silicon Motion, Inc., Jhubei (TW)

(72) Inventor: Yu-Hsiang Chung, Zhubei (TW)

(73) Assignee: SILICON MOTION, INC., Jhubei (TW)

( * ) Notice: Subject to any disclaimer, the term of this patent is extended or adjusted under 35 U.S.C. 154(b) by 140 days.

(21) Appl. No.: 17/025,004

(22) Filed: Sep. 18, 2020

(65) Prior Publication Data
US 2021/0165598 A1 Jun. 3, 2021

Related U.S. Application Data

(60) Provisional application No. 62/941,936, filed on Nov. 29, 2019.

(30) Foreign Application Priority Data

May 29, 2020 (TW) ................................ 109117980

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
USPC ....................................................... 711/154
See application file for complete search history.

(56) References Cited

U.S. PATENT DOCUMENTS

| 8,589,619 | B2 | 11/2013 | Yeh |
| 8,949,512 | B2 | 2/2015 | Vogan et al. |
| 9,274,937 | B2 | 3/2016 | Batwara et al. |
| 10,409,717 | B2 | 9/2019 | Hsu |

(Continued)

FOREIGN PATENT DOCUMENTS

| CN | 108733577 A | 11/2018 |
| TW | I423026 B | 1/2014 |

OTHER PUBLICATIONS

Non-Final Office Action dated Dec. 21, 2021, issued in U.S. Appl. No. 17/025,044.

*Primary Examiner* — Sanjiv Shah
*Assistant Examiner* — Elias Young Kim
(74) *Attorney, Agent, or Firm* — McClure, Qualey & Rodack, LLP

(57) ABSTRACT

Power recovery for data storage devices with an efficient space trimming technology is shown. A controller scans a non-volatile memory according to a programming order, collects a sequence of trimming information flags, and interprets a sequence of storage information scanned from the non-volatile memory to identify logical addresses and trimming code. Based on the logical addresses, a host-to-device mapping (H2F) table is rebuilt. Based on the trimming code, information of medium-length trimming and information of long-length trimming are recognized from a storage area of the non-volatile memory. According to the trimming information for medium-length trimming, dummy mapping data is programmed to the H2F table. According to the trimming information for long-length trimming, a trimming bitmap (TBM) is rebuilt. Each bit in the TBM marks space trimming of a first length.

16 Claims, 21 Drawing Sheets

(56) References Cited

U.S. PATENT DOCUMENTS

| | | |
|---|---|---|
| 10,437,737 B2 | 10/2019 | Chung et al. |
| 10,481,837 B2 | 11/2019 | Lin |
| 10,489,289 B1* | 11/2019 | Peterson ............... G06F 3/0652 |
| 2013/0132650 A1* | 5/2013 | Choi ................... G06F 12/0246 |
| | | 711/103 |
| 2013/0219106 A1* | 8/2013 | Vogan ................. G06F 12/0246 |
| | | 711/E12.008 |
| 2018/0210832 A1 | 7/2018 | Tang et al. |
| 2018/0321883 A1 | 11/2018 | Lin |
| 2019/0163621 A1* | 5/2019 | Doh .................... G06F 12/0246 |
| 2019/0324904 A1* | 10/2019 | Tan ....................... G06F 3/0679 |
| 2019/0369892 A1* | 12/2019 | Huang ................. G06F 3/0679 |
| 2020/0081830 A1* | 3/2020 | Desai .................. G06F 12/0246 |
| 2020/0379915 A1* | 12/2020 | Moertl .................. G06F 3/0626 |
| 2021/0064521 A1 | 3/2021 | Cho et al. |

\* cited by examiner ated # US 11,748,023 B2

DATA STORAGE DEVICE AND NON-VOLATILE MEMORY CONTROL METHOD

CROSS REFERENCE TO RELATED APPLICATIONS

This application claims the benefit of U.S. Provisional Application No. 62/941,936, filed on Nov. 29, 2019, the entirety of which is incorporated by reference herein.

This Application also claims priority of Taiwan Patent Application No. 109117980, filed on May 29, 2020, the entirety of which is incorporated by reference herein.

BACKGROUND OF THE INVENTION

Field of the Invention

The present invention is related to space trimming (space de-allocation) of a data storage device.

Description of the Related Art

There are various forms of non-volatile memory (NVM) for long-term data storage, such as flash memory, magnetoresistive random access memory (magnetoresistive RAM), ferroelectric RAM, resistive RAM, spin transfer torque-RAM (STT-RAM), and so on. These types of non-volatile memory may be used as the storage medium in a data storage device.

Non-volatile memory usually has special storage characteristics. In this technical field, control technologies based on the special storage characteristics of non-volatile memory are being developed. For example, space trimming technology of non-volatile memory has been developed.

BRIEF SUMMARY OF THE INVENTION

Power recovery for data storage devices with an efficient space trimming technology of is shown.

A data storage device in accordance with an exemplary embodiment of the present invention includes a non-volatile memory, a controller, and a temporary storage device. The controller and the temporary storage device are coupled to the non-volatile memory. The controller is configured to reconstruct the trimming information of the non-volatile memory in the temporary storage device. The controller scans the non-volatile memory according to a programming order to collect a sequence of trimming information flags. The controller interprets a piece of storage information as a logical address or trimming data (e.g., a section of trimming code) according to the trimming information flag. The controller uses the logical address to reconstruct a host-to-device mapping table. The controller uses the trimming data to determine whether a storage area in the non-volatile memory stores trimming information for medium-length trimming or for long-length trimming. The controller updates the host-to-device mapping table to store dummy mapping data corresponding to trimming information for medium-length trimming. The controller reconstructs a trimming bitmap based on trimming information for long-length trimming, wherein each bit of the trimming bitmap marks space trimming of a first length.

In an exemplary embodiment, medium-length trimming does not exceed the first length and is aligned to boundaries managed in units of a second length. Trimming information for medium-length trimming may include a starting logical address and a trimming length. When the trimming data shows medium-length trimming code, the controller determines that the corresponding storage area in the non-volatile memory stores for medium-length trimming a starting logical address and a trimming length.

In an exemplary embodiment, long-length trimming is aligned to boundaries managed in units of the first length, and is N times the first length, and is marked by N bits of the trimming bitmap, where N is a positive integer. The trimming bitmap includes a plurality of trimming bitmap sub-tables, wherein the N bits are managed in M trimming bitmap sub-tables, and the M trimming bitmap sub-tables are regarded as trimming information for the long-length trimming. M is a positive integer. When trimming data shows M numbers representing the M trimming bitmap sub-tables, the controller determines that the corresponding storage area in the non-volatile memory stores the M trimming bitmap sub-tables.

In an exemplary embodiment, the host-to-device mapping table includes a plurality of mapping sub-tables. Each mapping sub-table records mapping data, in units of the second length, of a logical address range of the first length.

The aforementioned controller may be implemented in other architectures. The foregoing concept can be used to implement a non-volatile memory control method.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (magnetoresistive RAM), a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called eMMC (embedded multimedia card).

A data storage device using a flash memory as a storage medium can be applied in a variety of electronic devices, including a smartphone, a wearable device, a tablet computer, a virtual reality device, etc. A calculation module of an electronic device may be regarded as a host that operates the data storage device equipped on the electronic device to access the flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Flash memory has its special storage characteristics which are described below.

The host side distinguishes data by logical addresses (for example, logical block addresses LBAs or global host page numbers GHPs). Mapping data is dynamically updated to map the logical addresses to the physical space of the flash memory.

Figure 1:
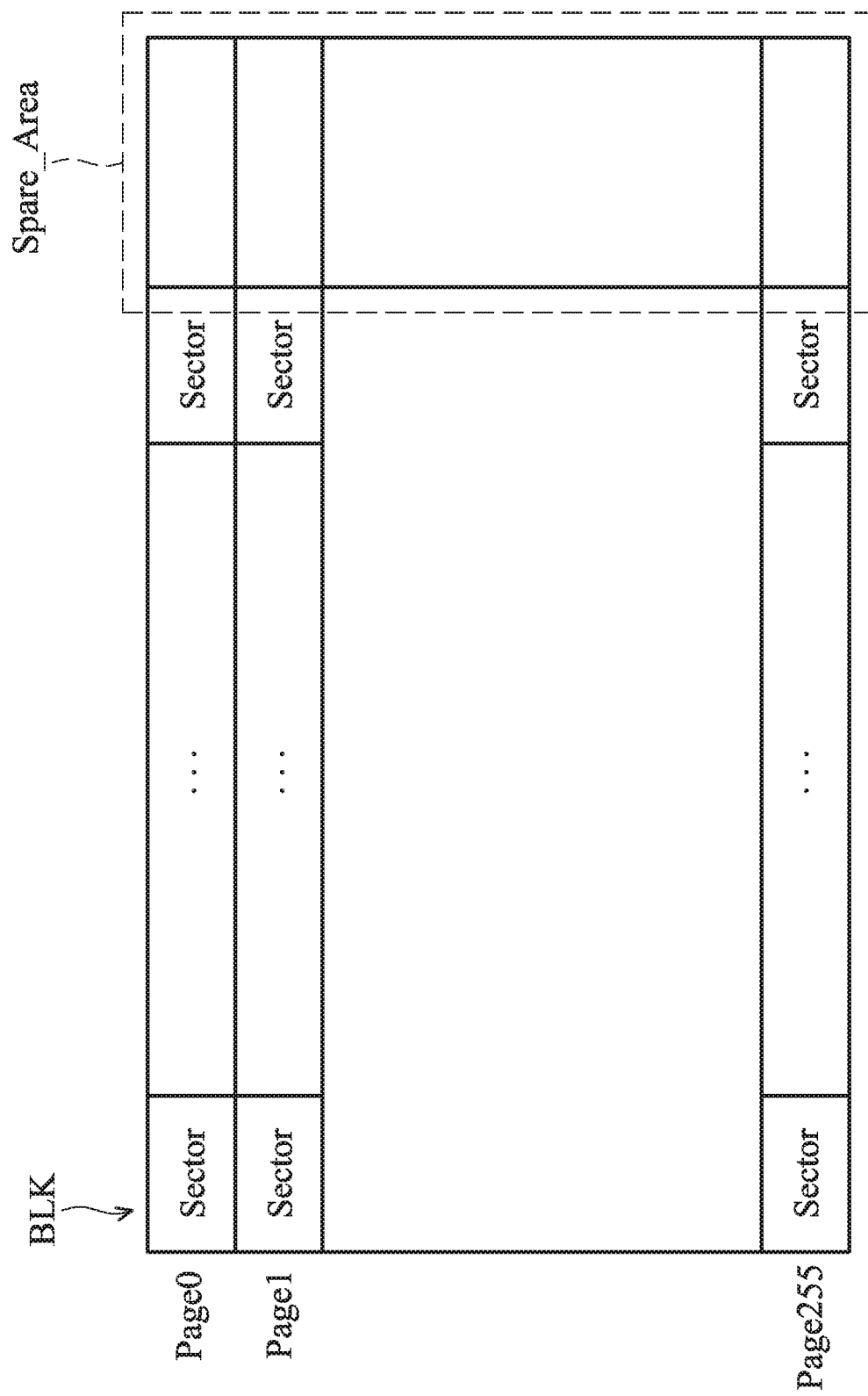
FIG. 1 illustrates the architecture of one block BLK.

The physical space of a flash memory is divided into a plurality of blocks. FIG. 1 illustrates the architecture of one block BLK.

As shown, one block BLK includes a plurality of pages (e.g., page 0 to page 255). Each page includes a plurality of sectors (e.g., 32 sectors per page), and each sector may store 512B user data. Thus, each page may provide 16 KB of storage space. One implementation is to sequentially program a block according to the page number (from low to high). Or, some embodiments use a multi-channel technology that greatly improves data throughput, which treats multiple blocks accessed at the same time through the different channels as a super block, and treats the pages accessed at the same time through the different channels as a super page. Multi-channel technology can use the storage space of a super block in sequence according to the super page number (from low number to high number). The block referred to in the following discussion can also be called a super block.

In an exemplary embodiment, a sector (512B) may correspond to a logical block address LBA. Taking a 4 KB data management mode as an example, each data management unit corresponds to a 4 KB space composed of eight consecutive sectors and is related to eight consecutive logical block addresses LBAs or indicated by one global host page number GHP. Each page (16 KB) may be divided into four data management units and related to four global host page numbers GHPs. As shown in FIG. 1, a block BLK includes a spare area Spare_Area, which is composed of the spare space at the end of each page. For each page, the four GHPs of the four data management units of this page may be annotated in this spare space. In an exemplary embodiment, each 4 KB sector corresponds to a 4B space in the spare area Spare_Area. In addition to being annotated in the spare area Spare_Area of each page, the global host page numbers GHPs related to the entire block BLK may be also programmed into the final page (e.g. page 255) of the block BLK as end-of-block (EoB) information. The complex mapping between the physical space and the logical addresses is shown by to the GHPs recorded in the spare area Spare_Area or recorded as the EoB information.

In particular, an important feature of flash memory is that data is not updated to the storage space of the old data. The new version of the data must be written into a spare space and the old data is invalidated. A block may only have sporadic valid data remained. The storage space of flash memory needs to be erased before being used again. As the spare blocks are gradually consumed, the number of spare blocks is reduced. When the spare blocks are insufficient (for example, less than a threshold amount), a garbage collection demand occurs. Sporadic valid data in a block is collected into another block through garbage collection. Blocks with only invalid data remained are released to be erased as spare blocks, and so that the number of spare blocks is increased to ensure the normal use of the data storage device. Garbage collection, however, may result in random storage in the same block.

It can be seen from the foregoing that the spatial configuration of flash memory is quite complicated. For example, 4B GHP information is recorded for each 4 KB data management unit. Each physical block may correspond to one physical-to-logical mapping table (F2H table). Reversely, a host-to-device mapping table may be established based on the physical-to-logical mapping tables of the different blocks. For example, a host-to-flash mapping table (H2F table), also known as a logical-to-physical mapping table, is established to show how the GHP numbers recognized at the host end map to the physical addresses of the flash memory.

However, as the manufacturing process progresses, the size of the flash memory is getting larger and larger. For a 4 TB flash memory, the H2F table is 4 GB. For an 8 TB flash memory, the H2F table is 8 GB. The oversized H2F table is not easy to manage.

One solution is to divide the H2F table into smaller-sized sub-tables. For example, an H2F table may be divided into sub-tables H2F_G # corresponding to different logical address groups G # (# is any integer from 0 to the biggest group number). Instead of downloading the whole H2F table from the flash memory, only the sub-table H2F_G # called by the host command is downloaded to be checked or to be updated. Compared with the complete H2F table, the dynamic update of the sub-tables H2F_G # only consumes a small amount of system resources.

This case specifically discusses the space trimming of flash memory. By trimming the flash memory, a specified logical address range is invalidated. Generally, a considerable space is trimmed each time, which relates to modification of a large number of sub-tables H2F_G #. It is very time-consuming to download such a large number of sub-tables H2F_G # for dummy mapping data programming of space trimming. Here, a new space trimming scheme is proposed, wherein a part of the H2F table is updated in background after a trimming command is regarded as completed.

Figure 2:
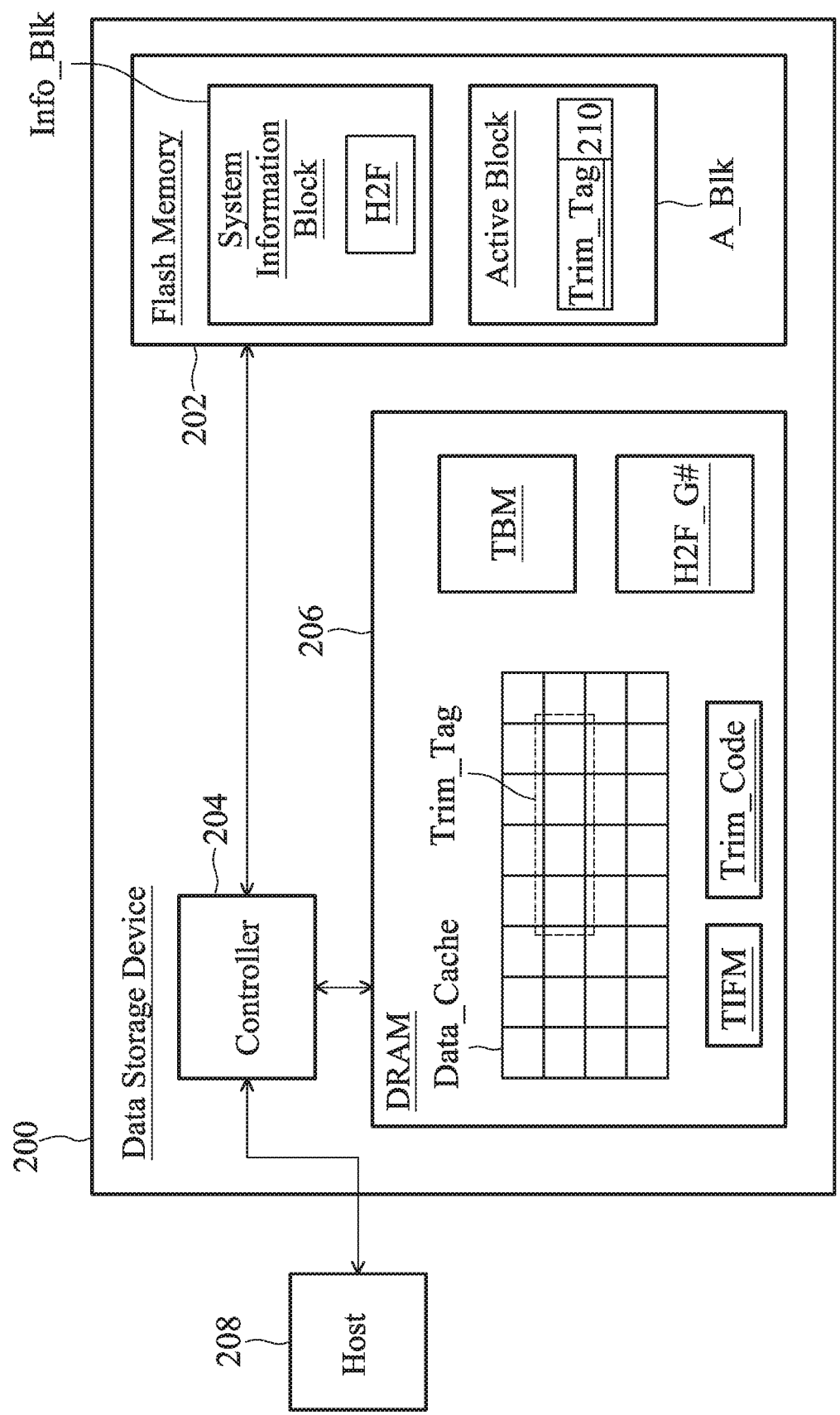
FIG. 2 illustrates a data storage device 200 in accordance with an exemplary embodiment of the present invention.

FIG. 2 illustrates a data storage device 200 in accordance with an exemplary embodiment of the present invention, which includes a flash memory 202, a controller 204, and a dynamic random access memory (DRAM) 206. The host 208 operates the flash memory 202 through the controller 204. Within the data storage device 200, the controller 204 may further perform storage optimization on the flash memory 202. For example, the space of the flash memory 202 may be reorganized to maximize the storage capability. The controller 204 temporarily stores data in the DRAM 206 when performing calculations. The DRAM 206 may be replaced by other temporary storage device, such as a static random access memory (SRAM), or any high-speed storage accessed by the controller 204.

There may be a variety of space planning for the DRAM 206. For example, a cache area Data_Cache may be allocated on the DRAM 206 to collect data in a data management unit of 4 KB. Every 4 KB data collected in the cache area Data_Cache is flushed together from the cache area Data_Cache to an active block A_Blk of the flash memory 202. The active block A_Blk is selected from a plurality of spare blocks. The active block A_Blk with finished data programming is regarded as a data block. The complete H2F table is generally stored in a system information block Info_Blk of the flash memory 202. Every time flushing data from the cache area Data_Cache to the active block A_Blk, the related sub-table H2F_G # is downloaded from the flash memory 202 to the DRAM 206 for modification, After the modification, the sub-table H2F_G # is stored back to the flash memory 202 (sealing) and thereby the H2F table is updated. A traditional space trimming involves downloading, modification, and sealing of sub-tables H2F_G #. However, when the trimming space is huge, the downloading, modification, and sealing of sub-tables H2F_G # is very time-consuming. An alternative plan is proposed in the present invention. According to a trimming command issued by the host 208, the controller 204 programs a trimming tag Trim_Tag into the cache area Data_Cache. Thus, the trimming tag Trim_Tag can be also flushed into the active block A_Blk for non-volatile storage. The trimming tag Trim_Tag shows which parts of the H2F table have not been updated corresponding to the trimming command. The controller 204 may first fill in a completion queue to report the completion of the trimming command to the host 208 while partially postpone the update of the H2F table. Later, during the free intervals, the controller 204 updates the H2F table based on the trimming tag Trim_Tag. Thus, the complex downloading, modification, and sealing of sub-tables H2F_G # will not drag the performance of the controller 204, and the efficiency of the data storage device 200 is significantly improved.

To help interpret the trimming tag Trim_Tag, the controller 204 further dynamically update a trimming information flag bitmap TIFM, trimming code Trim_Code, and a trimming bitmap TBM on the DRAM 206. The contents of the trimming information flag bitmap TIFM and trimming code Trim_Code will also be flushed to the spare area 210 of the active block A_Blk for non-volatile storage. In response to a reconstruction need during power recovery, the flash memory 202 is scanned. According to the trimming information flag bitmap TIFM and the trimming code Trim_Code stored in the spare area 210, the controller 204 can interpret the trimming tag Trim_Tag stored in the corresponding page. The trimming bitmap TBM marks the asynchronous part of the H2F table which has not been updated in response to the trimming command yet. In this manner, the controller 204 is prevented from erroneously respond to read and write commands from the host 208 even though the H2F table has not been completely updated.

In the prevent disclosure, three types of space trimming are discussed: long-length trimming; medium-length trimming; and short-length trimming. The long-length trimming is aligned to boundaries marked according to a first length, and the trimming scale is N times the first length, where N is a positive integer. The medium-length trimming does not exceed the first length, and aligned to boundaries marked according to a second length. The short-length trimming is shorter than the second length. In an exemplary embodiment, each sub-table H2F_G # involves logical addresses of the first length (e.g., 2 MB), and the data management unit (that is, the size of each cache entry allocated in the cache area Data_Cache) is the second length (e.g., 4 KB). The trimming techniques for the three trimming types are different. In response to the short-length trimming, dummy use data is directly programmed into the cache area Data_Cache to trim the corresponding small-sized logical address range. In response to the medium-length trimming, the starting logical address and the length are cached. In response to the long-length trimming, the related part of the trimming bitmap TBM is cached.

In the following paragraphs, the space trimming of logical block addresses LBA 5~LBA 100664323 is discussed as an example. The detailed operations of the controller 206 are shown.

Figure 3:
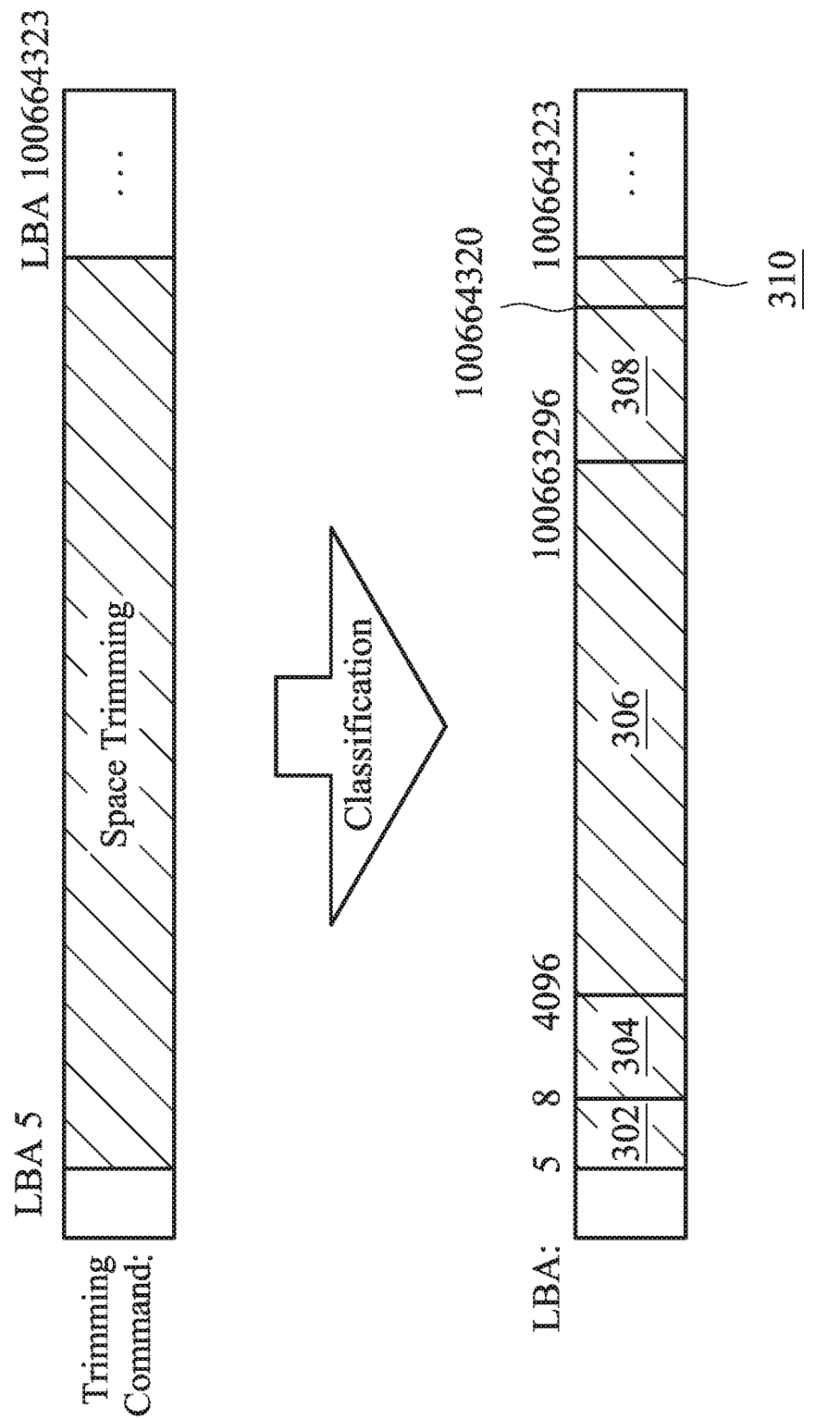
FIG. 3 illustrates how to divide the trimming space.

FIG. 3 illustrates how to divide the trimming space. The host 208 issues a trimming command of to trim from LBA 5 to LBA 100664323. The controller 204 divides the logical range LBA 5~LBA 100664323 into several trimming sections 302, 304, 306, 308, and 310. The trimming section 306, from LBA 4096 to LBA 100663295, is long-length trimming, and is aligned to 2 MB boundaries. The size of the trimming section 306 is a multiple of 2 MB, which is as much as possible in the overall trimming range. Prior to the trimming section 306, a trimming section 302 (LBA 5~LBA 7) smaller than 4 KB is named the first short-length trimming, and a trimming section 304 (LBA 8~LBA 4095) aligned according to 4 KB boundaries and shorter than 2 MB is named the first medium-length trimming. Following the trimming section 306, a trimming section 308 (LBA 100663296~LBA 100664319) aligned to 4 KB boundaries and shorter than 2 MB is named to the second medium-length trimming, and a trimming section 310 (LBA 100664320~LBA 100664323) shorter than 4 KB is named the second short-length trimming.

Figure 4:
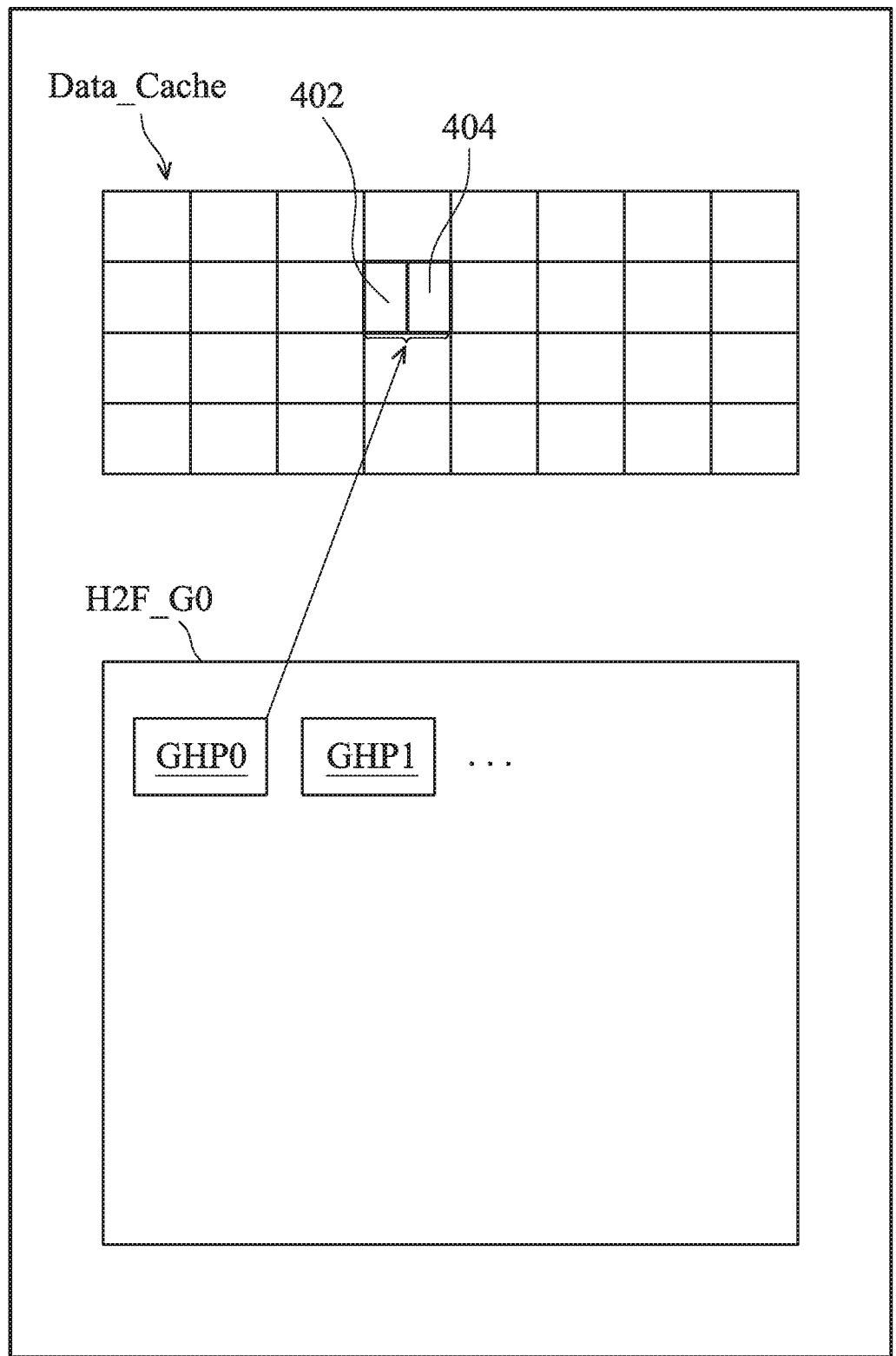
FIG. 4 illustrates the first short-length trimming (302) of LBA 5~LBA 7.

FIG. 4 illustrates the first short-length trimming (302) of LBA 5~LBA 7, which includes: step 1, programming 4 KB data into the cache area Data_Cache; and, step 2, updating the H2F table.

In step 1, the controller 204 programs the user data of LBA 0~LBA 4 (which is not requested to be trimmed) into a cache section 402 of the cache area Data_Cache, and programs dummy user data corresponding to LBA 5~LBA 7 (which is requested to be trimmed) into a cache section 404 of the cache area Data_Cache. The 2.5 KB user data of LBA 0~LBA 4 cached in the cache section 402 is combined with the 1.5 KB dummy user data in the cache section 404 to form 4 KB data. As shown, the combined 4 KB data fits the 4 KB data management unit and is cached by one cache entry in the cache area Data_Cache.

In step 2, the controller 204 modifies the sub-table H2F_G0 on the DRAM 206 to update the H2F table. According to the updated sub-table H2F_G0, the global host page number GHP 0 (i.e. LBA 0~LBA 7) is mapped to the 4 KB cache entry formed by the cache sections 402 and 404. The dummy user data in the cache section 404 represents the space trimming of LBA 5~LBA 7. The controller 204 may update a storage information table (not shown in the figure) on the DRAM 206 to record the logical addresses of user data stored in the different cache entries in the cache area Data_Cache. In FIG. 4, GHP 0 is stored in the storage information table to be flushed into the active block Act_Blk with the user data stored in the corresponding cache entry formed by cache sections 402 and 404. The information flushed into the flash memory 202 will be accessed in the future for H2F table reconstruction. In the other types of space trimming, trimming information rather than user data is programmed into the cache area Data_Cache. To correctly interpret the trimming information, trimming code may be stored in the storage information table.

Figure 5:
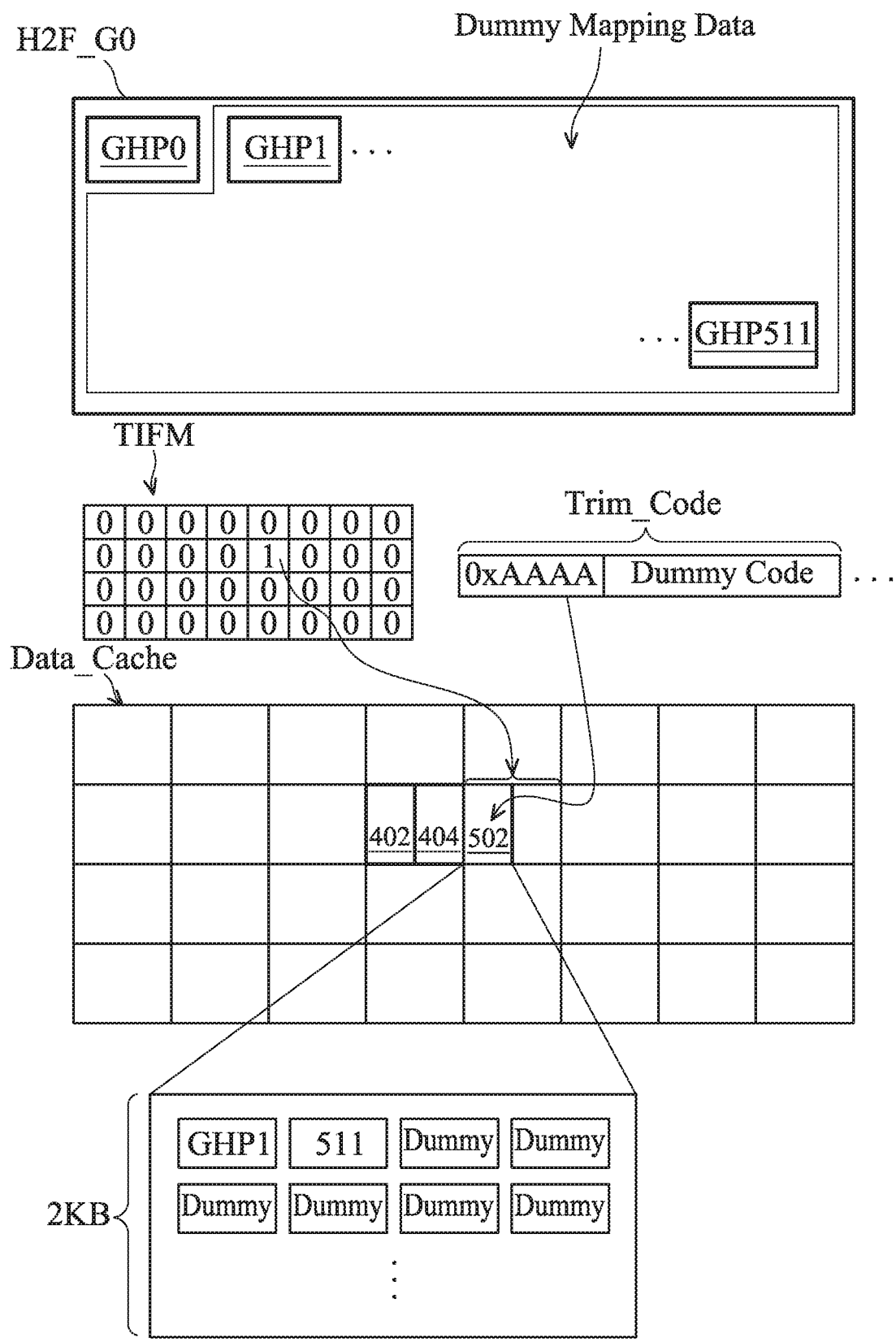
FIG. 5 illustrates the first medium-length trimming (304) of LBA 8~LBA 4095.

FIG. 5 illustrates the first medium-length trimming (304) of LBA 8~LBA 4095, including: step 1, updating the H2F table; step 2, updating a trimming information flag bitmap TIFM as well as trimming code Trim_Code; and, step 3, programming trimming information into the cache area Data_Cache.

In step 1, the controller 204 updates the sub-table H2F_G0 on the DRAM 206 corresponding to LBA 8~LBA 4095 (i.e., GHP 1~GHP 511) to update the H2F table accordingly. The controller 204 programs dummy mapping data (for example, all zeros) into the sub-table H2F_G0 as the mapping data of GHP 1~GHP 511. Different from the short-length trimming that programs dummy user data, the medium-length trimming programs dummy mapping data.

In step 2, the controller 204 updates the trimming information flag bitmap TIFM and the trimming code Trim_Code. Each bit of the trimming information flag bitmap TIFM corresponds to a 4 KB cache entry in the cache area Data_Cache. The trimming code Trim_Code is recorded in the aforementioned storage information table. In the trimming information flag bitmap TIFM, a bit corresponding to a 4 KB cache entry following the cache section 404 is asserted to "1", which means that the corresponding the 4 KB cache entry is allocated to store trimming information rather than user data. The controller 204 updates the storage information to store 4B trimming code Trim_Code for the trimming information. As shown, the 4B trimming code Trim_Code includes "0xAAAA" (2B) and 2B dummy code (for example, all zeros). In this exemplary embodiment, the trimming code Trim_Code is programmed in a 2B unit, corresponding to a halved cache entry (2 KB, storing trimming information) of the cache area Data_Cache. The 2B data "0xAAAA" means that the trimming information to be stored in the 2 KB cache section 502 includes a starting logical address and a trimming length of medium-length trimming.

In step 3, the controller programs the trimming information into the cache area Data_Cache. A starting logical address GHP1 and a trimming length of 511 are programmed into the 2 KB cache section 502 to indicate the trimming range GHP 1~GHP 511, i.e., the first medium-length trimming 304 of LBA 8~LBA 4095. As shown, dummy cache data is programmed into the remaining space in the 2 KB cache section 502.

Long-length trimming (306) is realized by updating the trimming bitmap BM. In the trimming bitmap TBM, each bit corresponds to a 2 MB logical space and is asserted to "1" corresponding to the space trimming of the 2 MB logical space. A 4 TB-capacity device needs to build a 256 KB (=4 TB/2 MB) trimming bitmap TBM. Such a huge trimming bitmap TBM may be grouped in units of 2 KB and divided into 128 trimming bitmap sub-tables TBM_G # (# is the TBM sub-table number). The complete 256 KB trimming bitmap TBM may be loaded on the DRAM 206 for dynamic update. However, instead programming the complete 256 KB trimming bitmap TBM into the cache area Data_Cache, only the modified trimming bitmap sub-tables TBM_G # are further programmed into the cache area Data_Cache as the trimming information regarding the long-length trimming (306) to be flushed to the active block A_Blk for non-volatile storage.

Figure 6A:
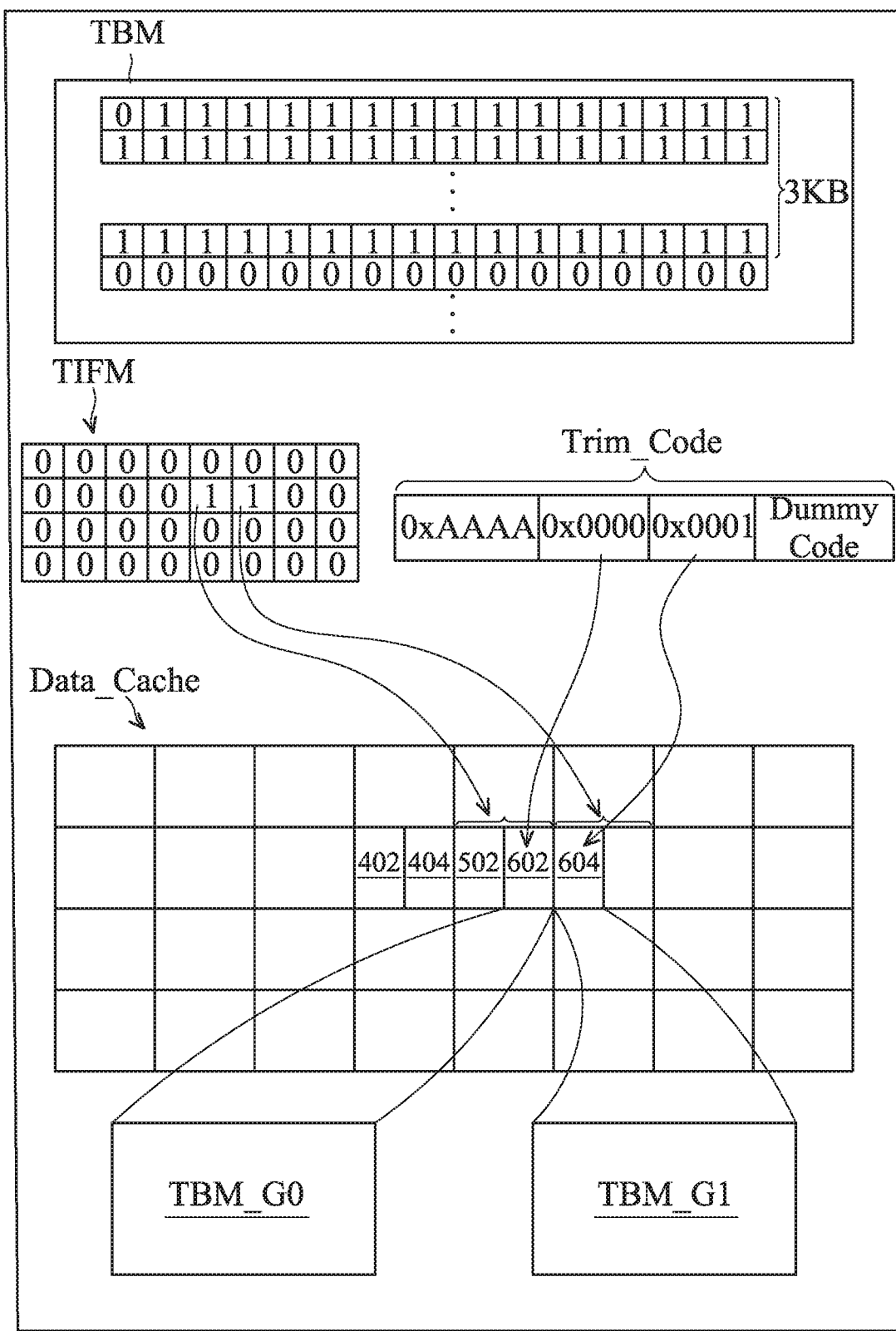
FIGS. 6A and 6B illustrate the long-length trimming (306) of LBA 4096~LBA 100663295.
Figure 6B:
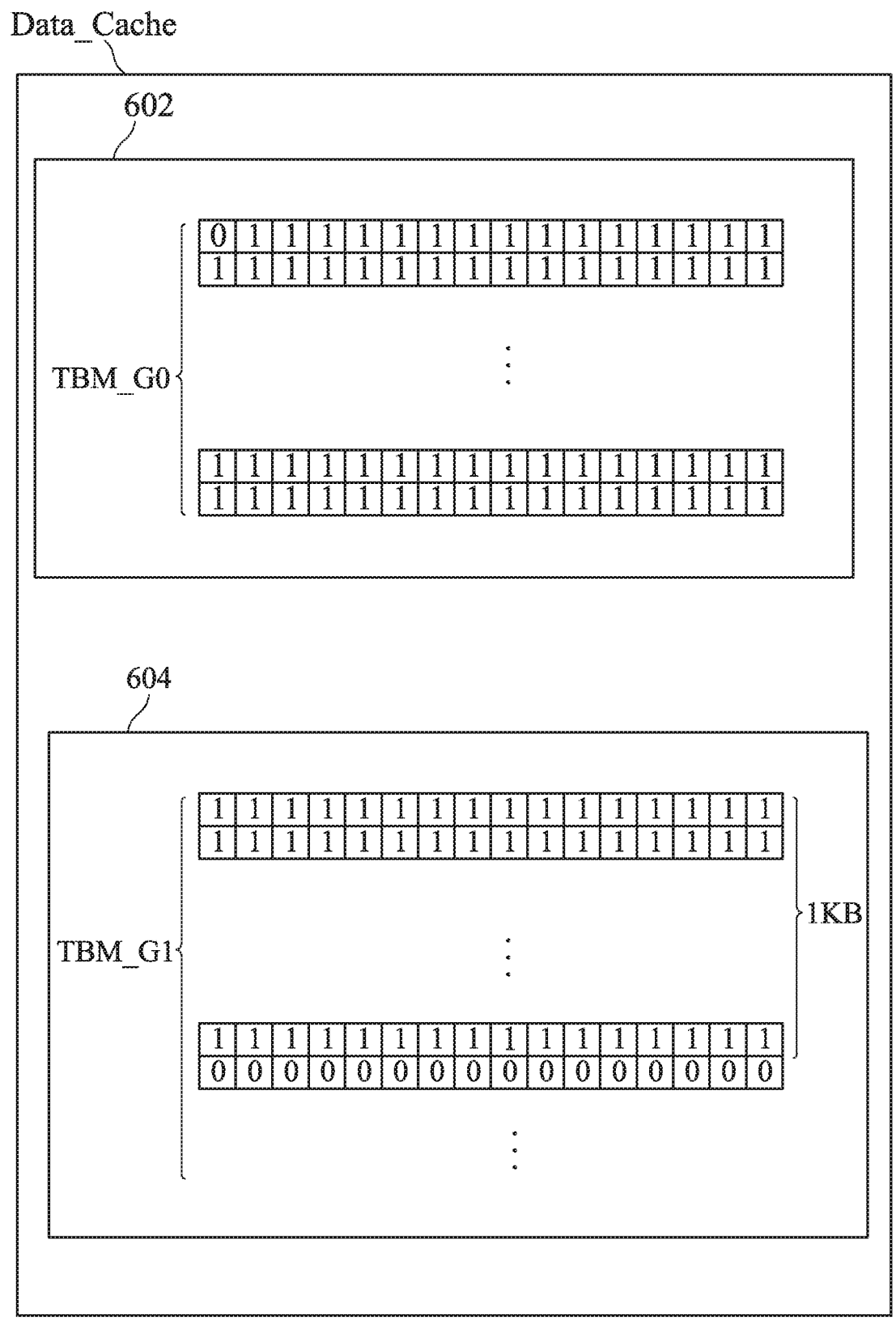

FIGS. 6A and 6B illustrate the long-length trimming (306) of LBA 4096~LBA 100663295, which includes: step 1, updating the trimming bitmap TBM; step 2, updating the trimming information flag bitmap TIFM and the trimming code Trim_Code; and, step 3, programming trimming information into the cache area Data_Cache.

In step 1, the controller 204 updates the 256 KB trimming bitmap TBM on the DRAM 206. The logical block addresses LBA 4096~LBA 100663295 (i.e., LBA 2 MB 49152 MB) correspond to bits 1~24596 of the trimming bitmap TBM (referring to the first 3 KB of TBM). As shown in the figure, the controller 204 asserts bits 1~24596 of the trimming bitmap TBM to "1", which involves modification on two trimming bitmap sub-tables TBM_G0 (the first 2 KB of TBM); and TBM_G1 (the second 2 KB of TBM).

In step 2, the controller 204 updates the trimming information flag bitmap TIFM and the trimming code Trim_Code. The controller 204 allocates the 2 KB cache section 602 and the next 2 KB cache section 604 to store the updated trimming bitmap sub-tables TBM_G0 (the first 2 KB of TBM) and TBM_G1 the second 2 KB of TBM), respectively. The cache section 602 and the previous cache section 502 belong to the same 4 KB cache entry whose corresponding bit in the trimming information flag bitmap TIFM has been asserted to "1" as shown in FIG. 5. In FIG. 6A, the modification made the trimming information flag bitmap TIFM is for the 4 KB cache entry containing the cache section 604. As shown, the corresponding bit in the trimming information flag bitmap TIFM is asserted to "1". The controller 204 further updates the trimming code Trim_Code in this step. After 0xAAAA that corresponds to the cache section 502, a TBM sub-table number 0x0000 of TBM_G0 corresponding to the cache section 602 and another TBM sub-table number 0x0001 of TBM_G1 corresponding to the cache section 604 are recorded to form the trimming code Trim_Code.

In step 3, the controller 204 programs the trimming information into the cache area Data_Cache. The trimming bitmap sub-table TBM_G0 is programmed into the 2 KB cache section 602. The trimming bitmap sub-table TBM_G1 is programmed into the 2 KB cache section 604.

FIG. 6B illustrates the trimming bitmap sub-tables TBM_G0 and TBM_G1 stored in the cache sections 602 and 604 of the cache area Data_Cache. In the 2 KB trimming bitmap sub-table TBM_G0, there is only the first bit (corresponding to the first short-length trimming 302 and the first medium-length trimming 304 on GHP 0~GHP 511) is zero, and the remaining bits are all 1. In the 2 KB trimming bitmap sub-table TBM_G1, the first 1 KB bits are all 1, and the remaining bits are all 0. The trimming bitmap sub-tables TBM_G0 and TBM_G1 represent the space trimming of LBA 2 MB~49152 MB (i.e., LBA 4096~LBA 100663295).

After the long-length trimming (306), the controller 204 performs the second medium-length trimming (308), and then the second short-length trimming (310).

Figure 7:
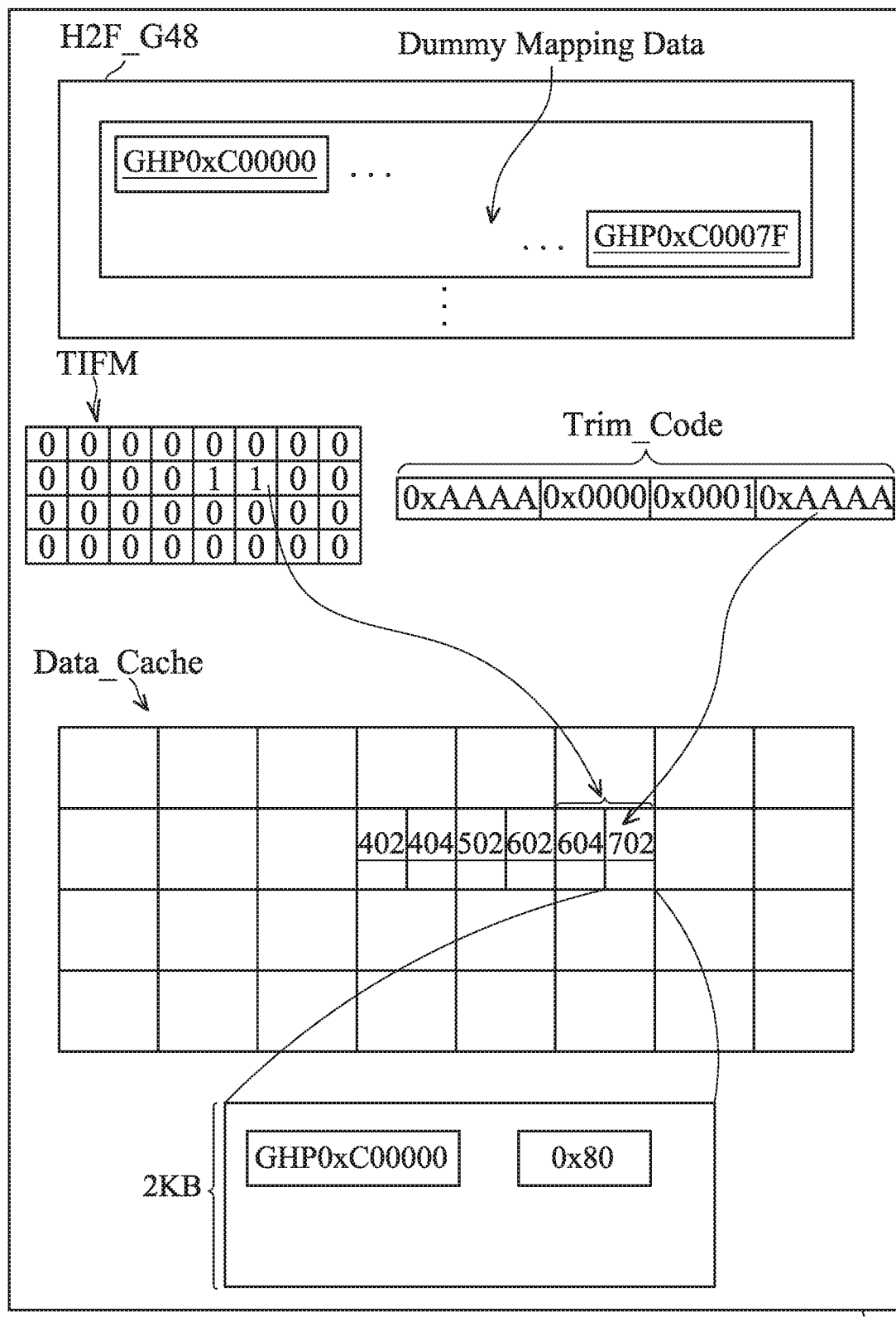
FIG. 7 illustrates the second medium-length trimming (308) of LBA 100663296~LBA 100664319.

FIG. 7 illustrates the second medium-length trimming (308) of LBA 100663296~LBA 100664319 (i.e., GHP 0xC00000~GHP 0xC0007F), which is performed according to the same steps of the first medium-length trimming (304).

In step 1, the controller 204 updates the sub-table H2F_G48 corresponding to LBA 100663296~LBA 100664319 (i.e., GHP 0xC00000~GHP 0xC0007F) on the DRAM 206 for the update of the H2F table. The controller 204 programs dummy mapping data into the sub-table H2F_G48 as the mapping data of GHP 0xC00000~GHP 0xC0007F.

In step 2, the controller 204 updates the trimming information flag bitmap TIFM and the trimming code Trim_Code. In the cache area Data_Cache, a 2 KB cache section 702 is allocated to correspond to the second medium-length trimming (308) and is in the same 4 KB cache entry with the cache section 604. In the trimming information flag bitmap TIFM, the bit corresponding to the 4 KB cache entry composed of the cache sections 604 and 702 has been asserted in FIG. 6A so is not modified in this step. Referring to the trimming code Trim-Code, the controller 204 programs "0xAAAA" after the TBM sub-table number "0x0001" of the trimming bitmap sub-table TBM_G1 stored in the cache section 604. The value "0xAAAA" means that the 2 KB cache section 702 stores trimming information of medium-length trimming.

In step 3, the controller 204 programs the trimming information into the cache area Data_Cache. The controller programs a starting logical address GHP 0xC0000 and a trimming length 0x80 into the 2 KB cache section 702 to indicate the trimming of GHP C0000~GHP 0xC0007F (i.e., the second medium-length trimming (308) of LBA 100663296~LBA 100664319).

Figure 8:
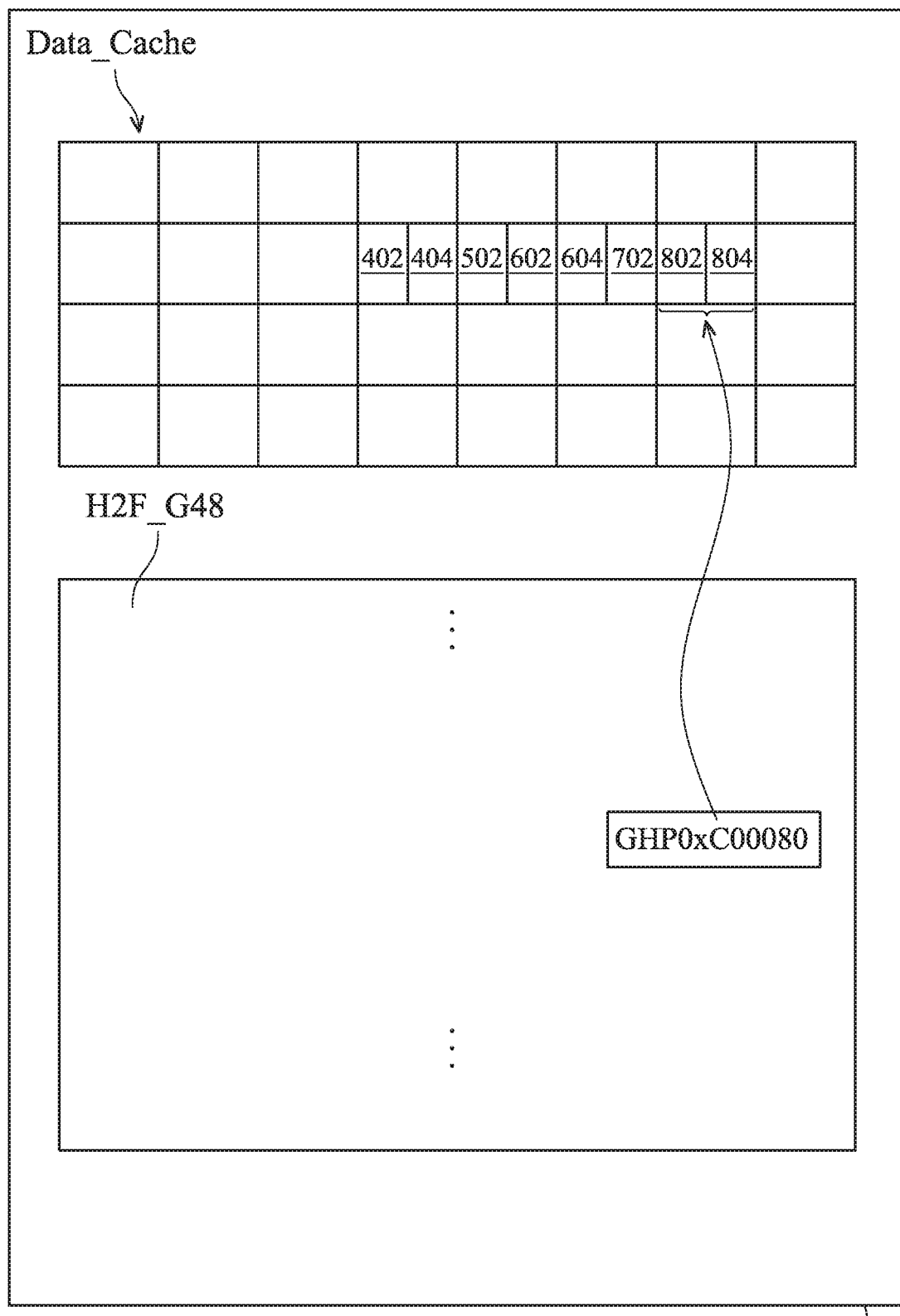
FIG. 8 illustrates the second short-length trimming (310) of LBA 100664320~LBA 100664323.

FIG. 8 illustrates the second short-length trimming (310) of LBA 100664320~LBA 100664323 within GHP 0xC00080. The same steps of the first short-length trimming (302) are performed.

In step 1, the controller 204 programs dummy user data corresponding to LBA 100664320~LBA 100664323 into the cache section 802 of the cache area Data_Cache, and copies the user data of LBA 100664324~LBA 100664327 (a section not to be trimmed) to the cache section 804 of the cache area Data_Cache. The 2 KB dummy user data in the cache section 802 and the 2 KB copied user data of LBA 100664324~LBA 100664327 in the cache section 804 are combined into 4 KB data, which conforms to the 4 KB data management unit and is stored in one 4 KB cache entry in the cache area Data_Cache.

In step 2, the controller 204 modifies the sub-table H2F_G48 on the DRAM 206 to update the mapping data of LBA 100664320~LBA 100664327 and, accordingly, the H2F table is updated. As the modified mapping data, GHP 0xC00080 is mapped to the 4 KB cache entry programmed in step 1. The dummy user data stored in the cache section 802 corresponds to the space trimming of LBA 100664320~LBA 100664323.

Figure 9:
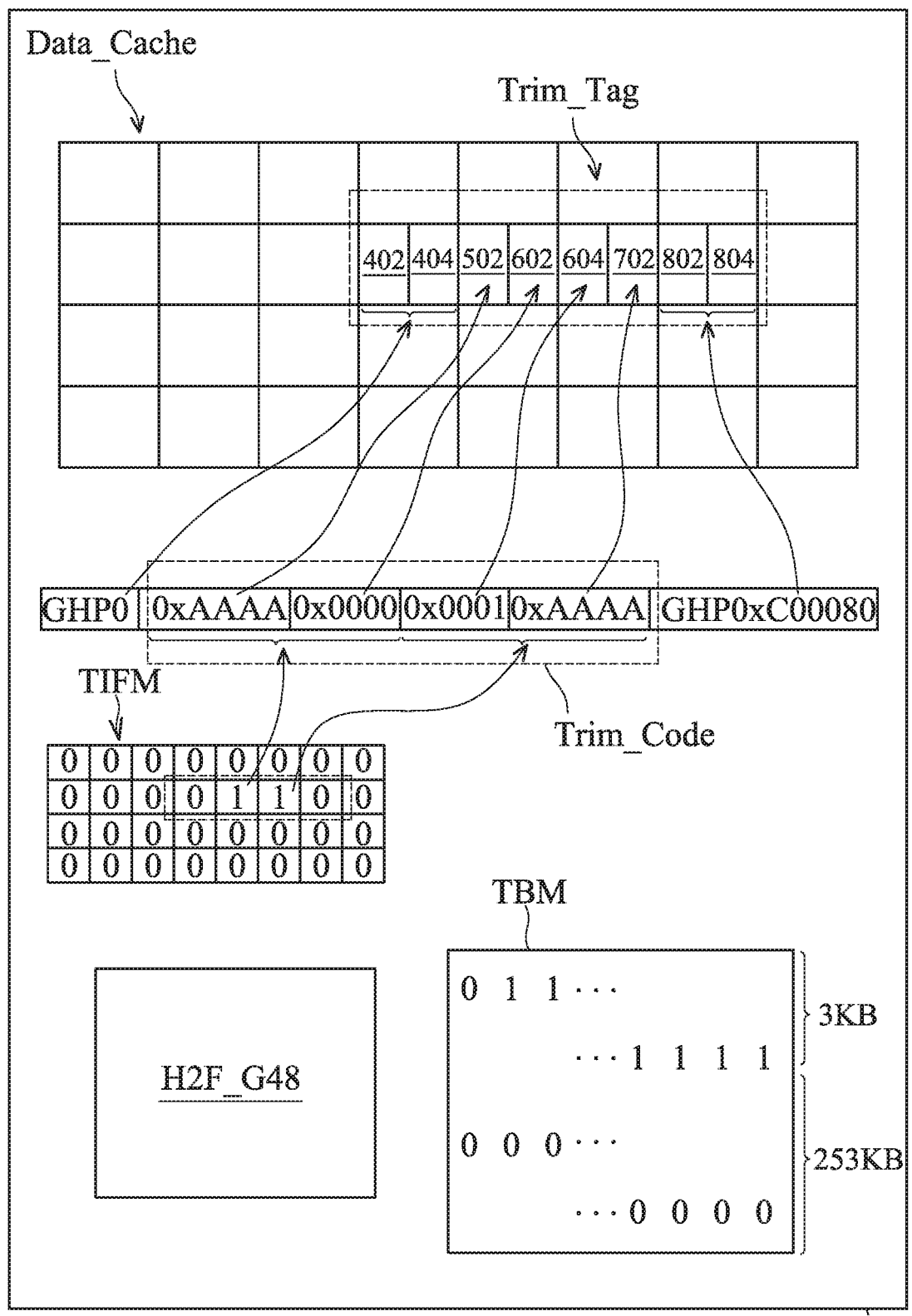
FIG. 9 illustrates the data stored in the DRAM 206 after the trimming command of LBA 5~LBA 100664323 is executed.

FIG. 9 illustrates the data stored in the DRAM 206 after the trimming command of LBA 5~LBA 100664323 is executed.

In the cache area Data_Cache, the trimming tag Trim_Tag occupies four 4-KB cache entries. The first 4 KB cache entry is divided into cache sections 402 and 404 and correspond to the first short-length trimming 302. The cache section 402 stores the copied user data of LBA 0~LBA 4. The cache section 404 stores dummy user data. The cache section 502 is 2 KB, and corresponds to the first medium-length trimming 304. The cache section 502 stores a starting logical address GHP 1 and a trimming length 511. Each of the cache sections 602 and 604 is 2 KB. Corresponding to the long-length trimming 306, the cache section 602 stores the trimming bitmap sub-table TBM_G0 and the cache section 604 stores the trimming bitmap sub-table TBM_G1. The cache section 702 is 2 KB, and corresponds to the second medium-length trimming 308. The cache section 702 stores a starting logical address GHP 0xC00000 and a trimming length 0x80. The fourth 4 KB cache entry is divided into two cache sections 802 and 804 and correspond to the second short-length trimming 310. The cache section 802 stores dummy user data, and the cache section 804 stores the copied user data of LBA 100664324~LBA 100664327.

Corresponding to the trimming tag Trim_Tag, the four bits in the trimming information flag bitmap TIFM are "0", "1", "1", and "0". Corresponding to the two "1"s in the middle, the 8B in the storage information table is interpreted as the trimming code Trim_Code rather than global host page numbers GHP #. The 8B trimming code Trim_Code is [0xAAAA; 0x0000; 0x0001; 0xAAAA].

It is noted that in the forgoing procedure, only a part of the H2F table is updated. In FIG. 9, mapping information loaded in the DRAM 206 is the sub-table H2F_G48, which is updated for the second short-length trimming (310). In addition to the mapping data updated in the sub-table H2F_G48, some mapping data has been sealed into the system information block Info_Blk to update the H2F table. The sealed mapping information includes: mapping GHP0 to the 4 KB cache entry composed of the cache sections 402 and 404; dummy mapping data corresponding to GHP 1~GHP 511 and GHP 0xC0000~GHP 0xC0007F; and mapping GHP 0xC00080 to the 4 KB cache entry composed of the cache sections 802 and 804. The remaining mapping information that has not been updated is marked in the trimming bitmap TBM.

In FIG. 9, the first 3 KB bits of the trimming bitmap TBM show the trimmed status of LBA 2M~49152 MB, which also mark the part of H2F table that has not been updated to comply with the trimmed status.

In an exemplary embodiment, the controller 204 checks the trimming bitmap TBM according to an LBA range of a read request issued by the host 208. "1" means that the corresponding 2 MB have been trimmed. "0" means that the controller 204 needs to further check the H2F table. Dummy mapping data represents that the space has been trimmed. Dummy user data (such as those cached in the cache sections 404 and 802) also represents that the space has been trimmed.

The trimming tag Trim_Tag occupying four 4 KB cache entries, the four corresponding trimming information flags [0, 1, 1, 0], and the 8B trimming code Trim_Code [0xAAAA, 0x0000, 0x0001, 0xAAAA] are flushed together into the active block A_Blk of the flash memory 202 for non-volatile storage, which can be used in the power recovery procedure for the rebuilding of the trimming status. The trimming tag Trim_Tag may be flushed to a data area of one page, and the trimming code Trim_Code [0xAAAA, 0x0000, 0x0001, 0xAAAA] may be flushed to a spare area 210 (originally allocated to store GHP #) of the page. The trimming information flags [0, 1, 1, 0] may be stored in a specific space allocated in the spare area 210, or may be coded into the trimming code Trim_Code.

It is described in the following paragraphs how to complete the update of the H2F table when the controller 204 is free. A valid page count table for all blocks of the flash memory 202 may be updated with the H2F table. In the present invention, the trimmed status is temporarily represented by the trimming bitmap TBM. However, the controller 204 may update the valid page count table during the idle intervals.

In an exemplary embodiment, the controller 204 gradually deasserts the bits of the trimming bitmap TBM from "1" to "0". Each deasserted bit corresponds to 2 MB. Similar to the medium-length trimming of FIG. 5 or FIG. 7, corresponding to the 2 MB space trimming, the corresponding sub-table H2F_G # should be updated and the related trimming information (e.g., a starting logical address and a trimming length) should be programmed into the cache area Data_Cache. Furthermore, similar to the long-length trimming illustrated in FIGS. 6A and 6B, the trimming bitmap sub-table TBM_G # containing the deasserted bits should be updated and programmed into the cache area Data_Cache.

Figure 10A:
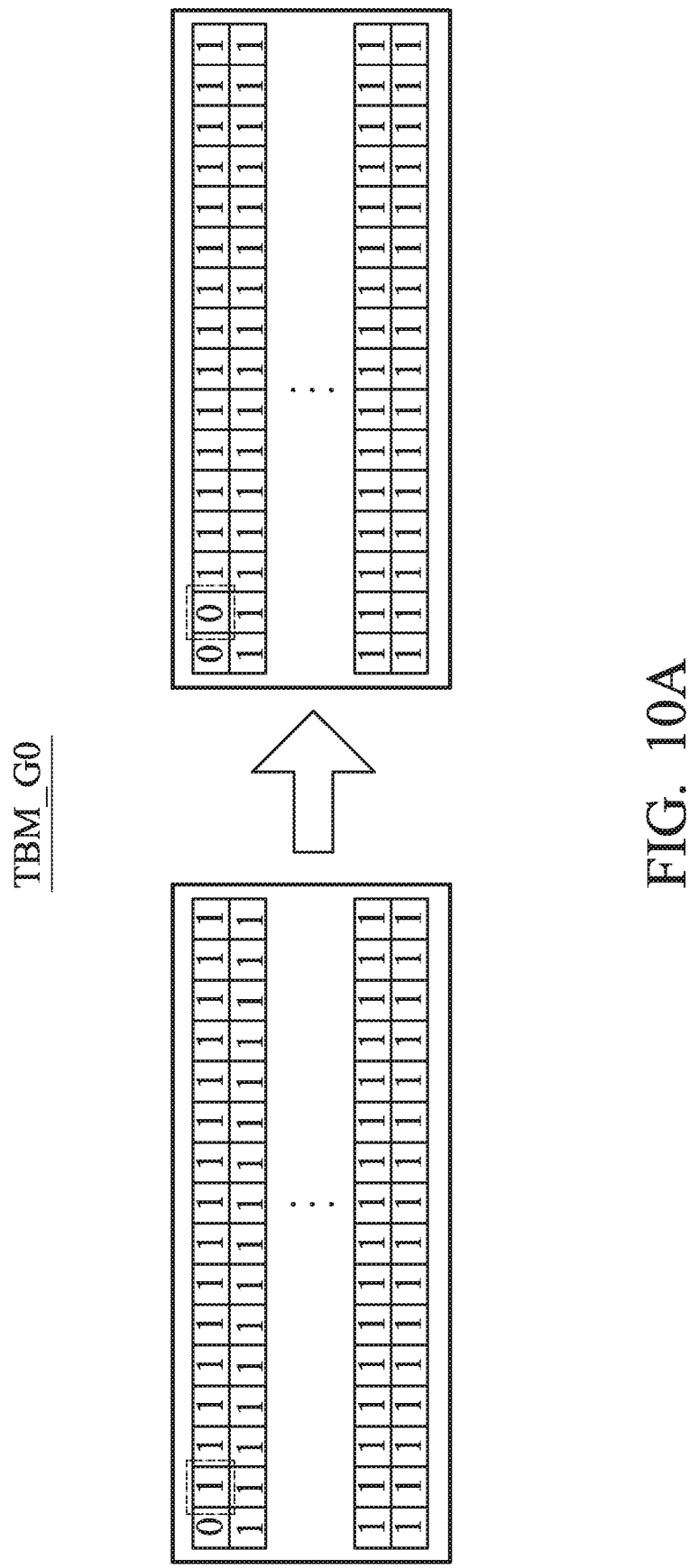
FIGS. 10A, 10B, and 10C illustrate how to deassert one bit of the trimming bitmap TBM from "1" to "0"
Figure 10B:
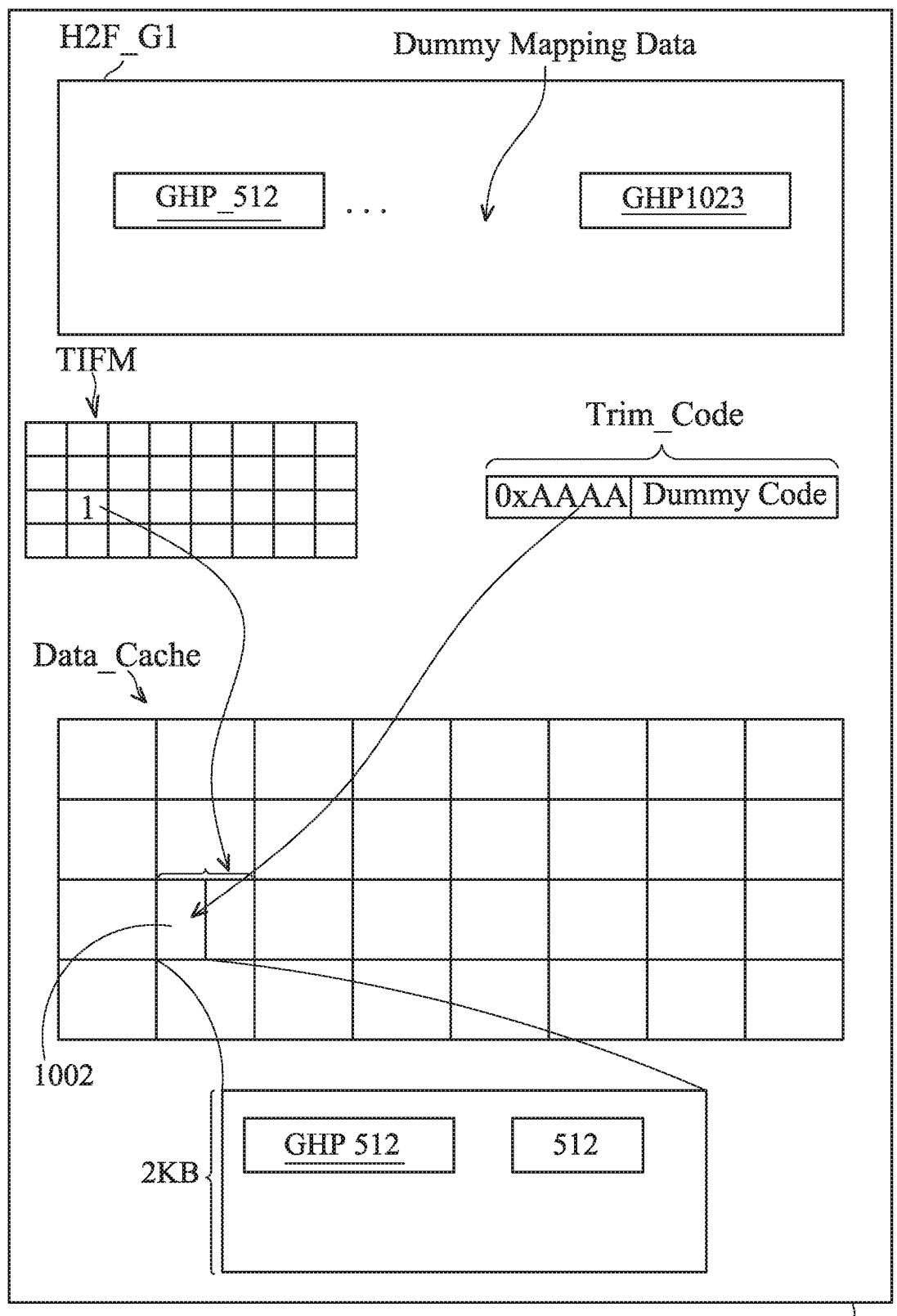
Figure 10C:
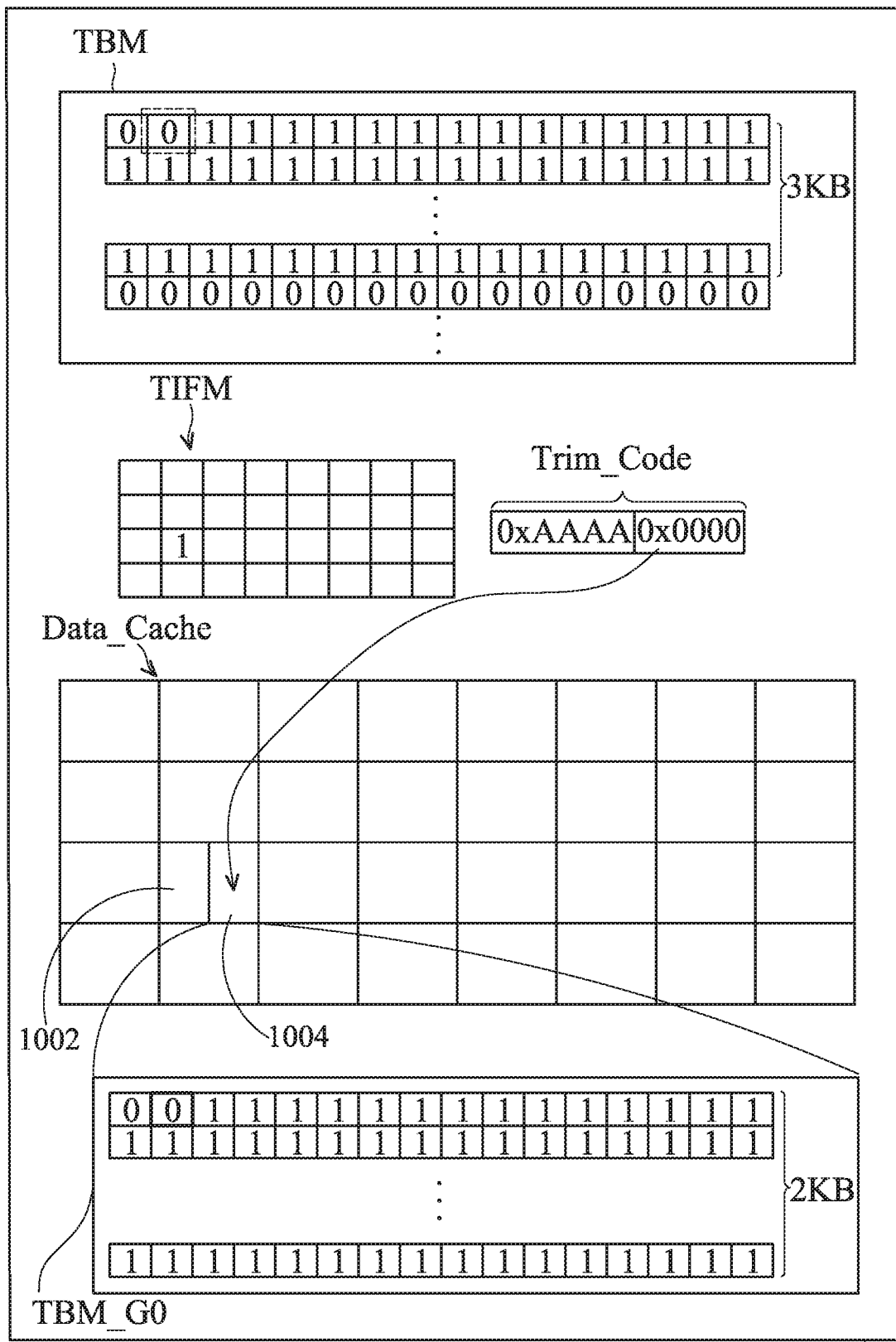

FIGS. 10A, 10B, and 10C illustrate how to deassert one bit of the trimming bitmap TBM from "1" to "0".

FIG. 10A illustrates the flipping of the target bit within the trimming bitmap TBM. The target bit is the first "1" in the target trimming bitmap sub-table TBM_G0, which corresponds to the trimming target GHP 512~GHP 1023. In FIG. 10A, the first "1" in the target trimming bitmap sub-table TBM_G0 is deasserted to "0".

FIG. 10B illustrates how to use the techniques of medium-length trimming (referring to FIG. 5 or FIG. 7) to update the H2F table, update the trimming information flag bitmap TIFM and the trimming code Trim_Code, and program the cache area Data_Cache according to the 2 MB space trimming of the trimming target GHP 512~GHP 1023.

In step 1, the controller 204 updates the sub-table H2F_G1 corresponding to the 2 MB trimming target GHP 512~GHP 1023 on the DRAM 206, which will be sealed into the flash memory 202 to update the H2F table. The controller 204 programs dummy mapping data (e.g., all zeros) into the sub-table H2F_G1 as the mapping data of GHP 512~GHP 1023.

In step 2, the controller 204 updates the trimming information flag bitmap TIFM and the trimming code Trim_Code. One bit of the trimming information flag bitmap TIFM is asserted to "1" to indicate a cache entry in the cache area Data_Cache for the flipping of the target bit of the trimming bitmap TBM. Within the cache area Data_Cache, the controller 204 allocates a 2 KB cache section 1002 (half a cache entry) to store a starting logical address GHP 512 and a trimming length 512 of the trimming target GHP 512~GHP 1023. Referring to the corresponding 4B trimming code Trim_Code, the first 2B is "0xAAAA", for correctly interpreting the content stored in the cache section 1002. The remaining 2B of the trimming code Trim_Code us dummy code, corresponding to the remaining half cache entry.

In step 3, the controller 204 programs the starting logical address GHP 512 and the trimming length 512 of the trimming target GHP 512~GHP 1023 into the 2 KB cache section 1002 (half a cache entry) corresponding to the trimming code "0xAAAA".

FIG. 10C illustrates how to use the techniques of long-length trimming (referring to FIGS. 6A and 6B) to program the updated target trimming bitmap sub-table TBM_G0 into the cache area Data_Cache. In the updated target trimming bitmap sub-table TBM_G0, the target bit has been deasserted from "1" to "0".

In step 1, the controller 204 updates the 256 KB trimming bitmap TBM on the DRAM 206 to deassert the second bit from "1" to "0".

In step 2, the controller 204 updates the trimming information flag bitmap TIFM and the trimming code Trim_Code. In the cache area Data_Cache, the controller 204 allocates the cache section 1004 to store the updated target trimming bitmap sub-table TBM_G0. The cache section 1004 is in a 4 KB cache entry (composed of the cache section 1002 and the cache section 1004) that has already been marked in the trimming information flag bitmap TIFM. Thus, the trimming information flag bitmap TIFM is not further modified in this step. In the trimming code Trim_Code, after 0xAAAA corresponding to the cache section 1002, the controller 204 programs a 2B target TBM sub-table number 0x0000 of the target trimming bitmap sub-table TBM_G0.

In step 3, the controller 204 programs the updated target trimming bitmap sub-table TBM_G0 into the 2 KB cache section 1004.

In summary, the update of the H2F table is partially postponed until the controller 204 is free. After programming a completion queue to inform the host 208 that the first command is finished, and prior to retrieving a second command issued by the host 208 from the command queue, the controller 204 updates the H2F table according to the trimming bitmap TBM bit by bit. Each deasserted bit in the trimming bitmap TBM involves an update on just one sub-table H2F_G #, which does not take too much time.

The procedure in response to a write command issued by the host 208 is discussed in the following paragraphs. When the logical address indicated by the write command is marked as trimmed by the trimming bitmap TBM, a procedure similar to the steps of FIGS. 10A~10C is performed by the controller 204 prior to the writing on the requested logical address. Prior to the requested writing, the corresponding bit in the trimming bitmap TBM should be deasserted and the H2F table should be updated according to the deasserted TBM bit.

Figure 11:
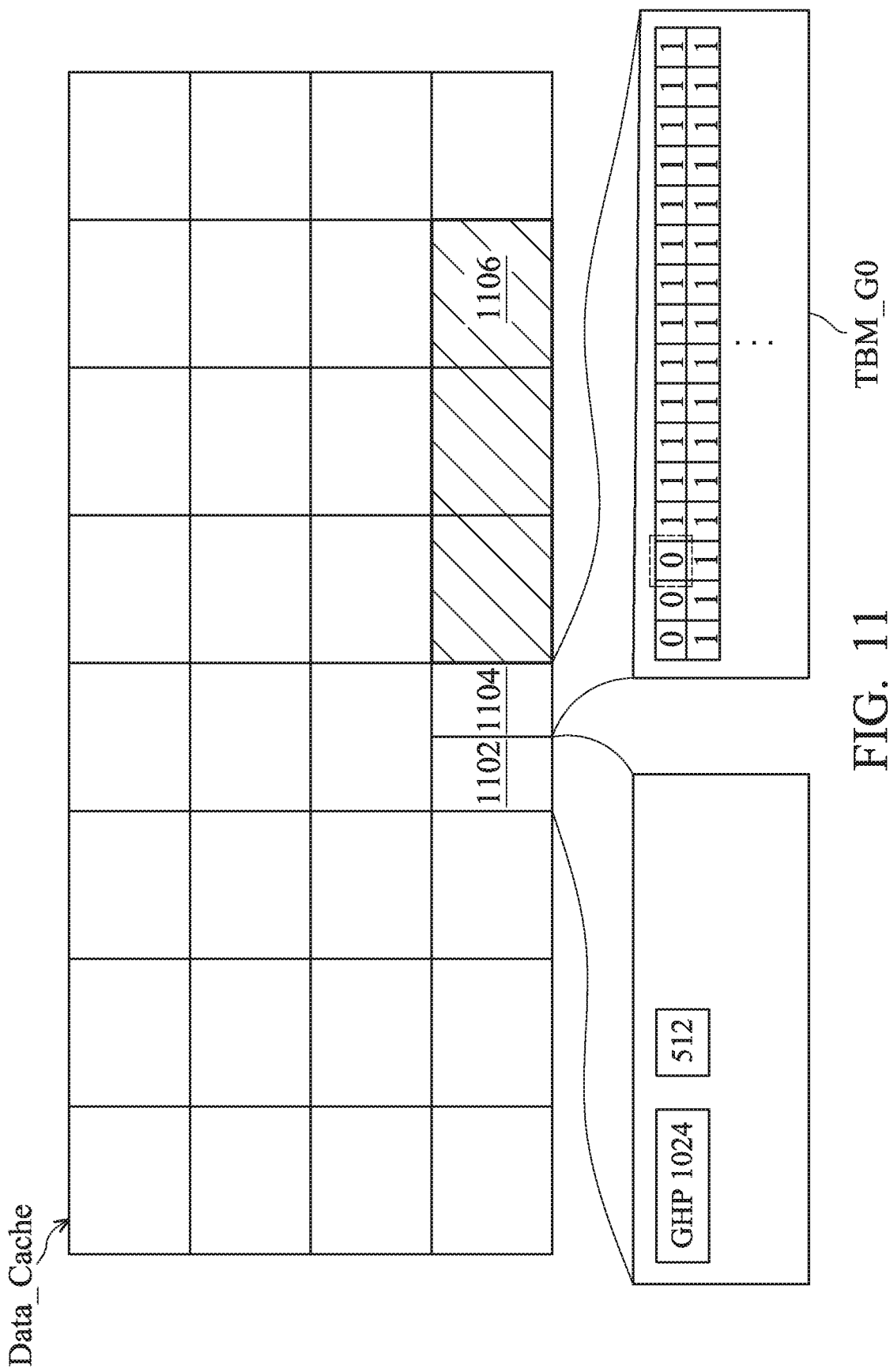
FIG. 11 illustrates a 12 KB writing procedure starting from LBA 10240 (i.e., LBA 5 MB)

FIG. 11 illustrates a 12 KB writing procedure starting from LBA 10240 (i.e., LBA 5 MB).

In the cache area Data_Cache, a 2 KB cache section 1102 and a 2 KB cache section 1104 are allocated to store information about the deasserting of one bit of the trimming bitmap TBM. In this example, the target bit is the third bit of the trimming bitmap TBM, which corresponds to LBA 5 MB and belongs to the trimming bitmap sub-table TBM_G0. The target bit relates to 2 MB space trimming of GHP 1024~1535, and involves the update of the sub-table H2F_G3. The controller 204 updates the sub-table H2F_G3 to record dummy mapping data for GHP 1024~1535, and programs a starting logical address GHP 1024 and a trimming length 512 into the 2 KB cache section 1102 (half a cache entry in the cache area Data_Cache). The controller 204 then deasserts the target bit of the trimming bitmap TBM from "1" to "0", and programs the updated trimming bitmap sub table TBM_G0 into the cache section 1104. The same as the aforementioned technology, although not shown in the figure, the controller 204 further asserts the corresponding bit of the trimming information flag bitmap TIFM to "1" to indicate the cache sections 1102 and 1104, and updates the trimming code Trim_Code to [0xAAAA, 0x0000].

After updating the sub-table H2F_G3 to show the space trimming of GHP 1024~1535, the controller 204 executes the writing of the 12 KB user data. As shown, the controller 204 programs the 12 KB user data into the cache section 1106 which includes three cache entries. The all dummy sub-table H2F_G3 is modified to map GHP1279~1281 to the cache section 1106. The space trimming of GHP 1024~1278 and GHP 1282~1535 can still be recognized according to the remaining dummy mapping data in the sub-table H2F_G3.

In an exemplary embodiment, the trimming bitmap TBM may lose due to an expected power-off event. In order to make good use of the backup power of the device, the controller 204 may just partially flush data from the DRAM 206 to the flash memory 202, such as flushing just the cache area Data_Cache and the related entry information to the flash memory 202. The entry information may be a logical address or trimming code, and may further include the trimming information flag bitmap TIFM. Part of the H2F table may not be updated in time. Therefore, a sudden power-off recovery (SPOR) procedure is required to reconstruct the trimming bitmap TBM and the H2F table.

Figure 12A:
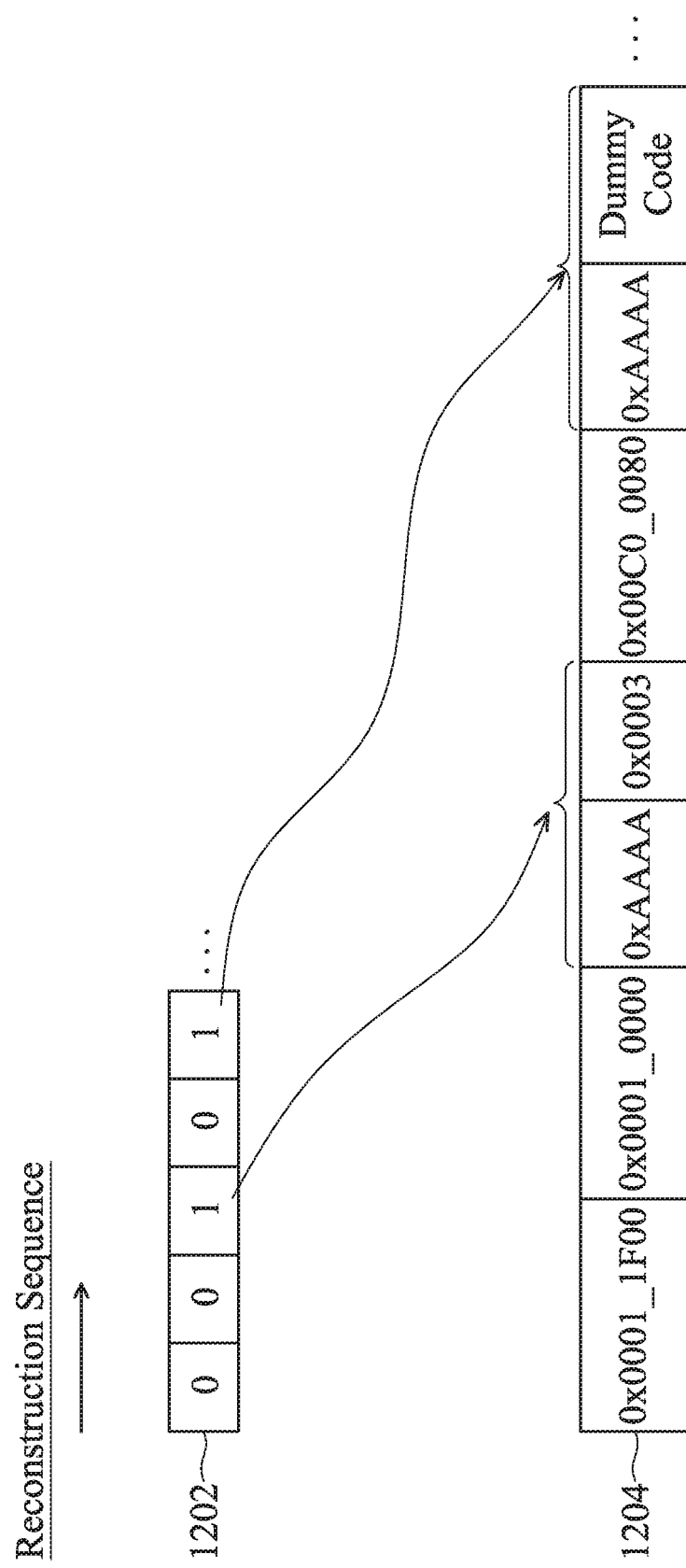
FIGS. 12A, 12B, and 12C illustrate the table reconstruction in accordance with an exemplary embodiment of the present invention.
Figure 12B:
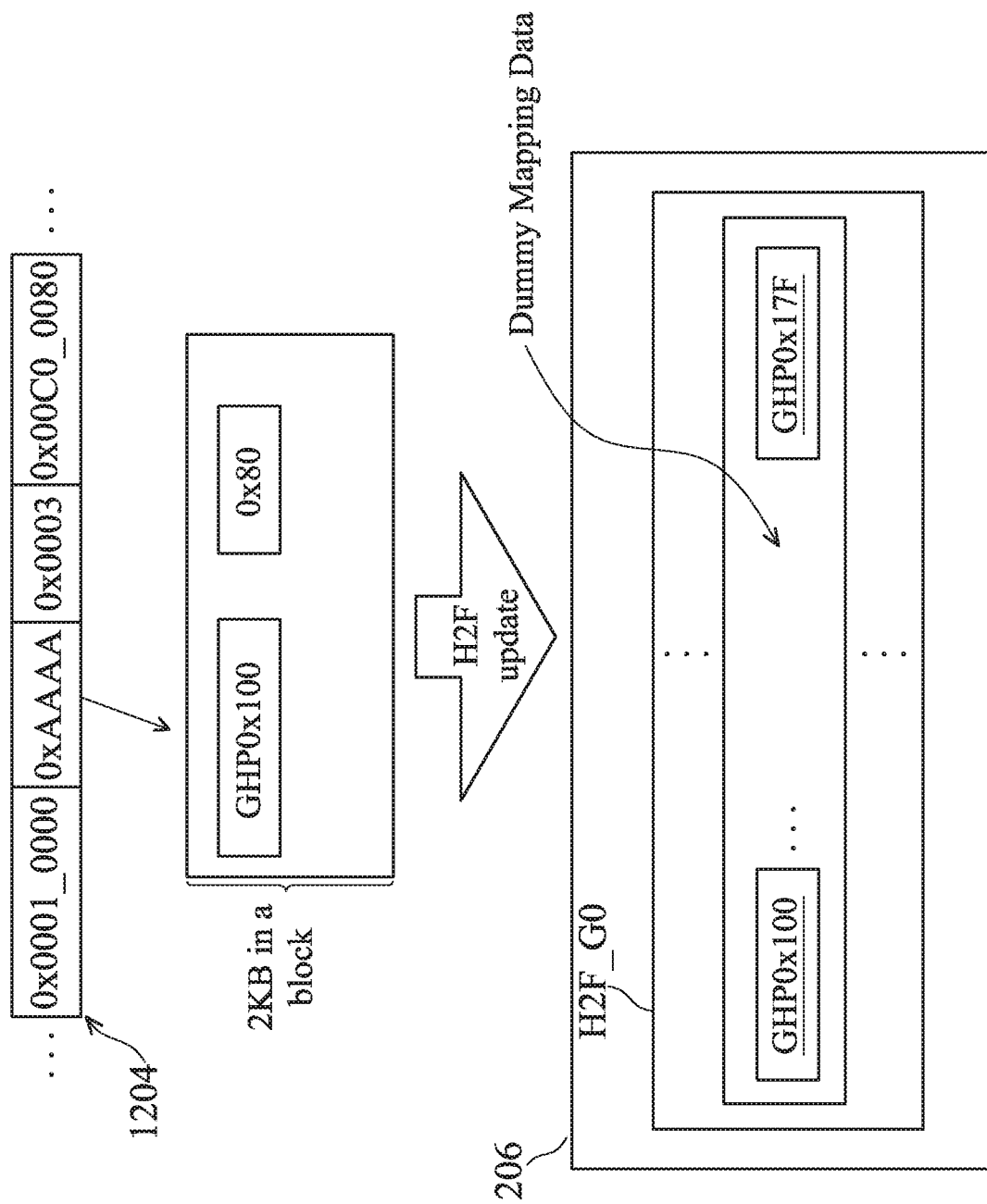
Figure 12C:
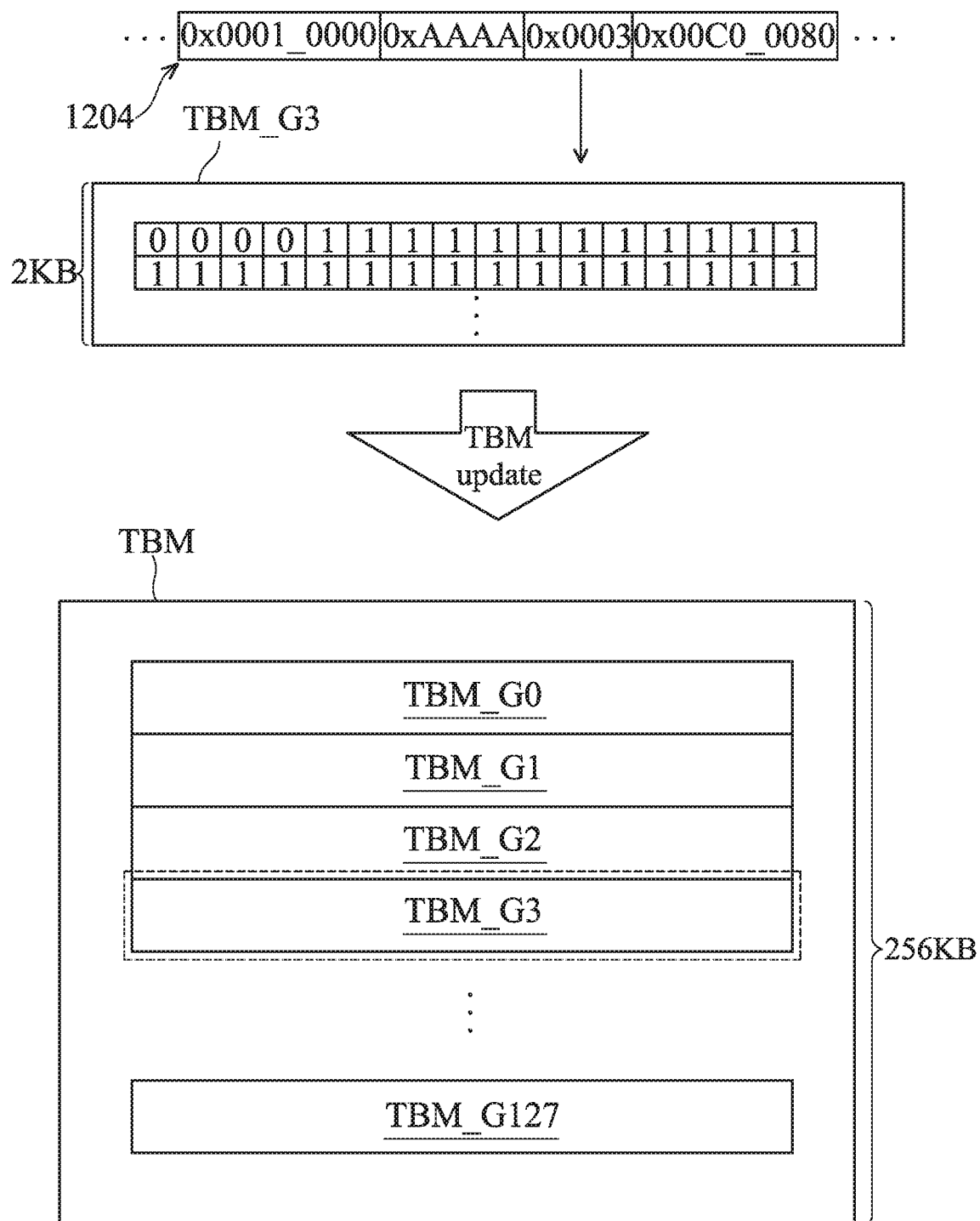

FIGS. 12A, 12B, and 12C illustrate the table reconstruction in accordance with an exemplary embodiment of the present invention.

Referring to FIG. 12A, during the power recovery procedure, the controller 204 scans the flash memory 202 (for example, according to the programming order of the blocks recorded in the system information block Info_Blk) and thereby obtains a trimming information flag sequence 1202 from the end-of-block (EoB) information of the scanned blocks. In the sequence 1202, each bit corresponds to 4 KB data of one block, wherein the 4 KB data is related to 4B storage information (e.g., a global host page number GHP #, or a section of trimming code Trim_Code). When a trimming information flag is "0", the corresponding 4 KB data is interpreted as user data, and the corresponding 4B storage information is a global host page number GHP #. When a trimming information flag is "1", the corresponding 4 KB data is interpreted as trimming information, and the corresponding 4B storage information is a section of trimming code Trim_Code. The trimming information flag sequence 1202 relates to five pieces of 4 KB data, and the corresponding five sections of 4B storage information form a storage information sequence 1204. The storage information sequence 1204 may be obtained from the EoB information, too.

As shown, in the trimming information flag sequence 1202, the first "1" corresponds to the 4B storage information [0xAAAA, 0X0003] in the storage information sequence 1204, indicating that the corresponding 4 KB data includes trimming information of two different types. "0xAAAA" means that the first 2 KB data includes a starting logical address and a trimming length of medium-length trimming. Different from "0xAAAA", "0x0003" should be interpreted as a TBM sub-table number, indicating that the subsequent 2 KB data relates to long-length trimming and is a trimming bitmap sub-table TBM_G3. The second "1" in the trimming information flag sequence 1202 corresponds to the 4B storage information [0xAAAA, dummy code] in the storage information sequence 1204, which means that in the corresponding 4 KB data only the first 2 KB data is meaningful. "0xAAAA" means that the first 2 KB data includes a starting logical address and a trimming length of medium-length trimming. The following specifically discusses the table reconstruction based on the first "1" in the trimming information flag sequence 1202.

Referring to FIG. 12B, according to "0xAAAA", the corresponding 2 KB data includes a starting logical address GHP0x100 and a trimming length 0x80 of medium-length trimming. The controller 204 loads the sub-table H2F_G0 corresponding to GHP0x100 to the DRAM 206, and programs dummy mapping data into the sub-table H2F_G0 as the mapping data of GHP0x100~GHP0x17F. After sealing the sub-table H2F_G0 into the flash memory 202, the space trimming of GHP0x100~GHP0x17F is presented in the updated H2F table.

Referring to FIG. 12C, according to "0x0003", the corresponding 2 KB data in the block is interpreted as a trimming bitmap sub-table TBM_G3 related to long-length trimming. The controller 204 downloads the 2 KB trimming bitmap sub-table TBM_G3 to update a trimming bitmap TBM stored in the DRAM 206. Accordingly, the trimming bitmap sub-table TBM is rebuilt.

Figure 13:
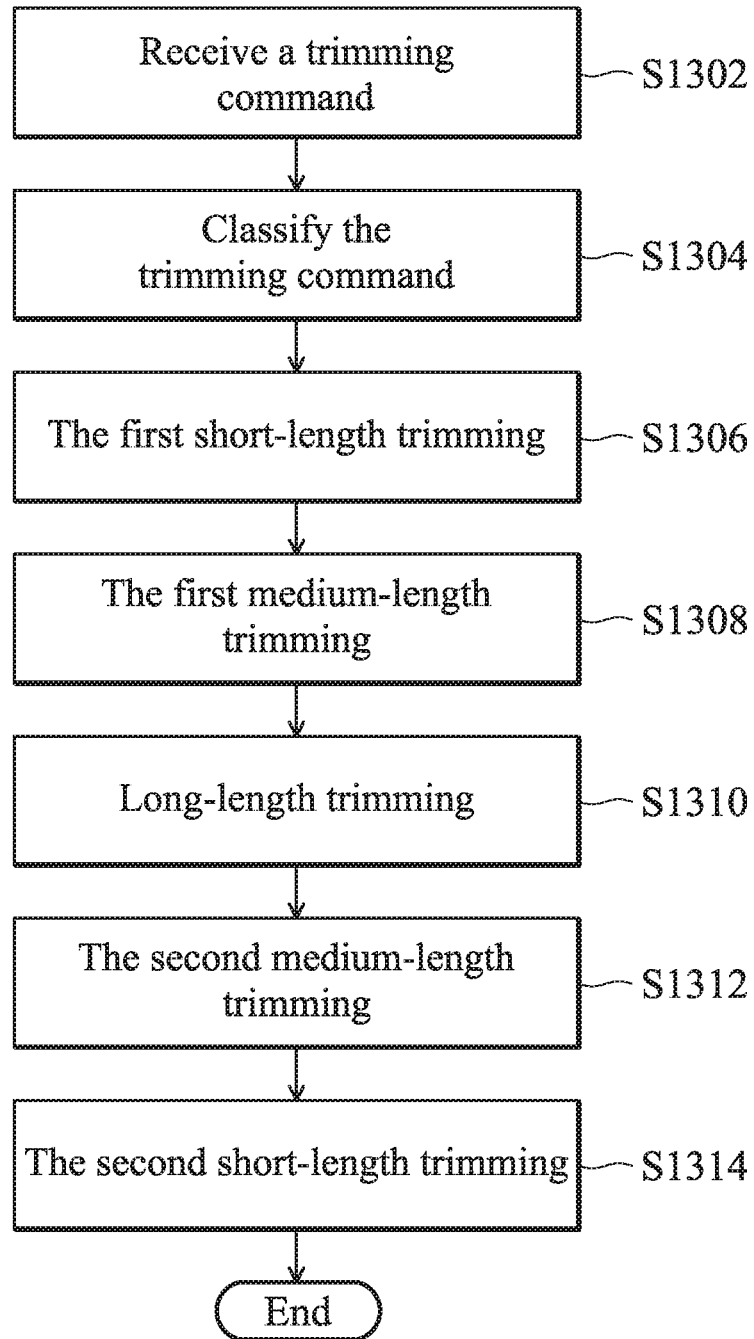
FIG. 13 is a flowchart depicting a procedure of space trimming in accordance with an exemplary embodiment of the present invention.

FIG. 13 is a flowchart depicting a procedure of space trimming in accordance with an exemplary embodiment of the present invention. In step S1302, a trimming command is received. In step S1304, the trimming command is classified (referring to FIG. 3). In step S1306, the first short-length trimming is performed (referring to FIG. 4). Step S1306 may be skipped when the first short-length trimming is not required. In step S1308, the first medium-length trimming is performed (referring to FIG. 5). Step S1308 may be skipped when the first medium-length trimming is not required. In step S1310, long-length trimming is performed (referring to FIGS. 6A and 6B). Step S1310 may be skipped when the long-length trimming is not required. In step S1312, the second medium-length trimming is performed (referring to FIG. 7). Step S1312 may be skipped when the second medium-length trimming is not required. In step S1314, the second short-length trimming is performed (referring to FIG. 8). Step S1314 may be skipped when the second short-length trimming is not required. After finishing the different types of space trimming, the trimming command is completed. For example, the controller 204 can program a completion queue to inform the host 208 that the trimming command is completed, and then the controller 204 is allowed to receive another command issued by the host 208. In the space trimming procedure illustrated in FIG. 13, the long-length trimming performed by S1310 does not waste the system resource in the update of the H2F table. The controller 204 quickly responds to the trimming command with the trimming procedure in FIG. 13. The subsequent commands issued by host 208 are answered by the controller 204 without being dramatically delayed by the trimming command.

After the trimming procedure of FIG. 13, the content stored in the DRAM 206 may be those shown in FIG. 9. In response to a read command issued by the host 208, the controller 204 needs to check the trimming bitmap TBM to avoid missing the trimming status those have not been updated to the H2F table. When an unexpected power-off event occurs, the controller 204 flushes the trimming tag Trim_Tag, the trimming information flag bitmap TIFM, and the trimming code Trim_Code to the flash memory 202, which will be read out in the power recovery procedure.

Figure 14:
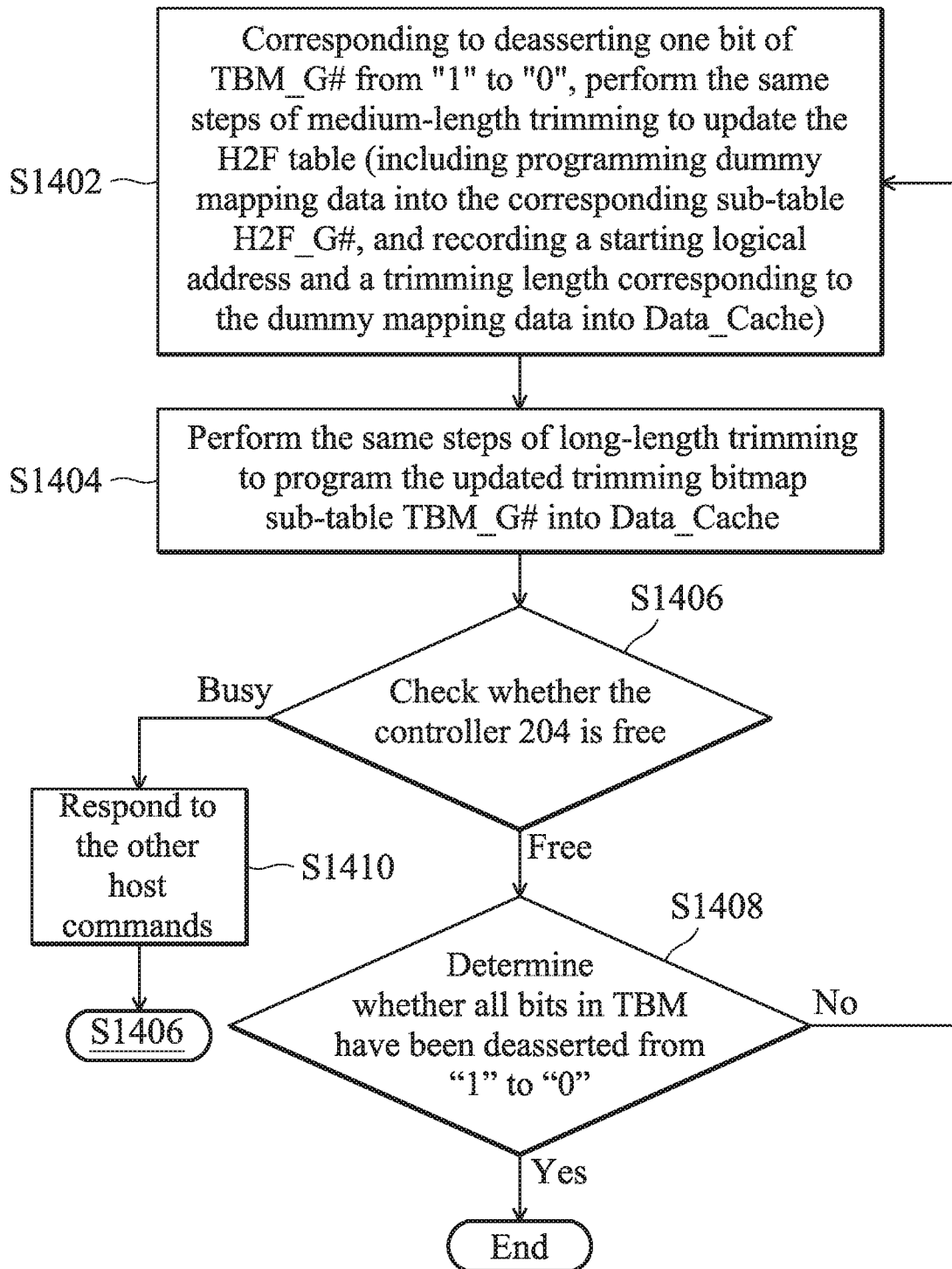
FIG. 14 is a flowchart illustrating how to update the H2F table in background according to the trimming bitmap TBM.

FIG. 14 is a flowchart illustrating how to update the H2F table in background according to the trimming bitmap TBM.

In step S1402, corresponding to deasserting one bit of the trimming bitmap sub-table TBM_G # from "1" to "0", the controller 204 performs the same steps of medium-length trimming to update the H2F table (including programming dummy mapping data into the corresponding sub-table H2F_G #, and recording a starting logical address and a trimming length corresponding to the dummy mapping data into the cache area Data_Cache). In step S1404, the controller 204 performs the same steps of long-length trimming to program the updated trimming bitmap sub-table TBM_G into the cache area Data_Cache. It is checked in step S1406 that whether the controller 204 is free. For example, the controller 204 is free when all queued commands in the command queue have been completed. It is determined in step S1408 whether all bits in the trimming bitmap TBM have been deasserted from "1" to "0". If no, steps S1402 and S1404 are repeated when the controller 204 is free. When there are commands waiting to be executed by the controller 204, step S1410 is performed to respond to these commands.

Figure 15:
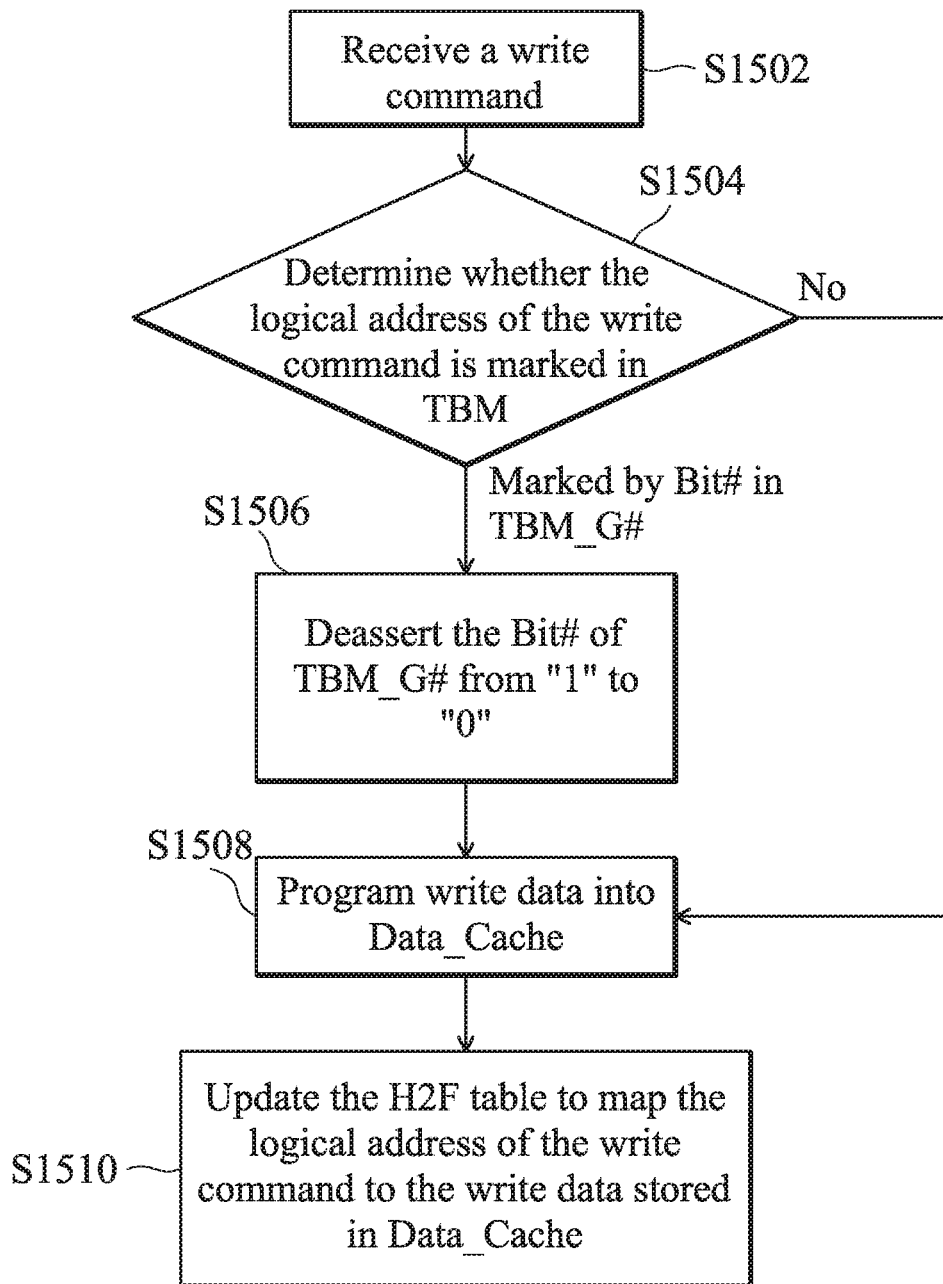
FIG. 15 is a flowchart illustrating how to respond to a write command issued by the host 208 in accordance with an exemplary embodiment of the present invention.

FIG. 15 is a flowchart illustrating how to respond to a write command issued by the host 208 in accordance with an exemplary embodiment of the present invention.

In step S1502, the controller 204 receives a write command. In step S1504, the controller 204 looks up the trimming bitmap TBM to determine whether the logical address of the write command is marked in the trimming bitmap TBM. If the logical address of the write command is marked by a bit Bit # of a trimming bitmap sub-table TBM_G #, the controller 204 performs step S1506 to deassert the bit Bit # of the trimming bitmap sub-table TBM_G # from "1" to "0". In step S1506, the controller 204 may perform the same steps of medium-length trimming to update the H2F table (including programming dummy mapping data into the corresponding sub-table H2F_G #, and recording a starting logical address and a trimming length corresponding to the dummy mapping data into the cache area Data_Cache), and perform the same steps of long-length trimming to store the updated trimming bitmap sub-table TBM_G # in the cache area Data_Cache. In step S1508, the controller 204 programs write data into the cache area Data_Cache. In step S1510, the controller 204 updates the H2F table to map the logical address of the write command to the write data stored in the cache area Data_Cache. The flowchart of FIG. 15 properly cope with a small amount of writing that occurs after long-length trimming.

Figure 16:
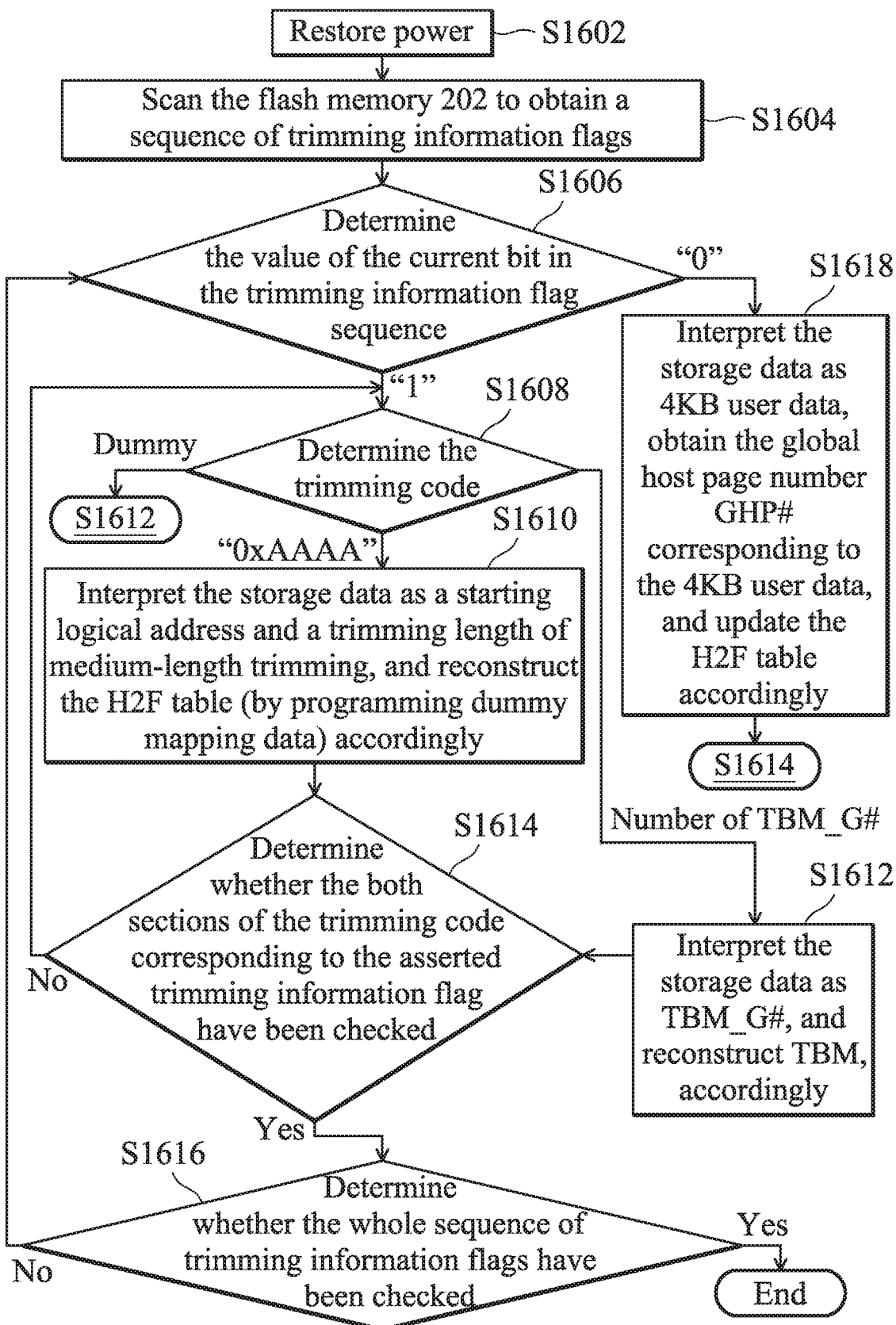
FIG. 16 is a flowchart illustrating a power recovery procedure in accordance with an exemplary embodiment of the present invention.

FIG. 16 is a flowchart illustrating a power recovery procedure in accordance with an exemplary embodiment of the present invention.

In step S1602, the power is restored. In step S1604, the controller 204 scans the flash memory 202 (for example, according to the programming order) to obtain a sequence of trimming information flags. In step S1606, the controller 204 determines the value of the current bit in the trimming information flag sequence. If it is "1", the controller 204 determines the corresponding trimming code in step S1608. If the trimming code is "0xAAAA", the controller 204 performs step S1610. In step S1610, the controller 204 interprets the storage data as a starting logical address and a trimming length of medium-length trimming, and reconstructs the H2F table accordingly. When it is determined in step S1608 that the trimming code is a TBM sub-table number of a trimming bitmap sub-table TBM_G #, the controller 204 performs step S1612. In step S1612, the controller 204 interprets the storage data as the trimming bitmap sub-table TBM_G #, and reconstructs the trimming bitmap TBM, accordingly. In step S1614, it is determined whether the both sections of the trimming code corresponding to the asserted trimming information flag have been checked. If not, the controller 204 performs step S1608 again. If yes, the controller 204 performs step S1616 to determine whether the whole sequence of trimming information flags have been checked. If no, the controller returns to step S1606. If yes, the procedure ends.

When it is determined in step S1606 that the trimming information flag is "0", step S1618 is performed. The controller 204 interprets the storage data as 4 KB user data, obtains the global host page number GHP # corresponding to the 4 KB user data, and updates the H2F table accordingly.

The forgoing techniques that the controller 204 operates the flash memory 202 may be implemented in the other structures. Space trimming of a data storage device based on the aforementioned concepts should be regarded as within the scope of the present invention. Control methods based on the aforementioned concepts are also proposed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
   a non-volatile memory; and
   a controller and a temporary storage device which are coupled to the non-volatile memory, wherein the controller is configured to reconstruct trimming information of the non-volatile memory in the temporary storage device,
   wherein:
   the controller scans the non-volatile memory according to a programming order to collect a sequence of trimming information flags, and the controller interprets a piece of storage information as a logical address or trimming data according to a corresponding trimming information flag;
   in response to determining that a trimming information flag shows that a corresponding piece of storage information is a logical address, the controller uses the logical address to reconstruct a host-to-device mapping table;
   in response to determining that a trimming information flag shows that a corresponding piece of storage information is trimming data, the controller uses the trimming data to determine whether a storage area in the non-volatile memory stores trimming information for medium-length trimming or for long-length trimming, wherein by the different kinds of trimming data, a management of medium-length trimming is separated from a management of long-length trimming;
   in response to determining that trimming data shows that a corresponding storage area in the non-volatile memory stores trimming information for medium-length trimming, the controller updates the host-to-device mapping table to store dummy mapping data corresponding to the trimming information for medium-length trimming, to show space trimming by dummy mapping data; and
   in response to determining that trimming data shows that a corresponding storage area in the non-volatile memory stores trimming information for long-length trimming, the controller reconstructs a trimming bitmap based on the trimming information for long-length trimming, wherein each bit of the trimming bitmap marks space trimming of a first length, and the trimming bitmap shows space trimming which has not yet been updated to the host-to-device mapping table as dummy mapping data.

2. The data storage device as claimed in claim 1, wherein:
medium-length trimming does not exceed the first length and is aligned to boundaries managed in units of a second length.

3. The data storage device as claimed in claim 2, wherein:
trimming information for medium-length trimming includes a starting logical address and a trimming length.

4. The data storage device as claimed in claim 3, wherein:
when trimming data shows medium-length trimming code, the controller determines that the corresponding storage area in the non-volatile memory stores for medium-length trimming a starting logical address and a trimming length.

5. The data storage device as claimed in claim 4, wherein:
long-length trimming is aligned to boundaries managed in units of the first length, and is N times the first length, and is marked by N bits of the trimming bitmap, where N is a positive integer.

6. The data storage device as claimed in claim 5, wherein:
the trimming bitmap includes a plurality of trimming bitmap sub-tables, wherein the N bits are managed in M trimming bitmap sub-tables, and the M trimming bitmap sub-tables are regarded as trimming information for the long-length trimming, where M is a positive integer.

7. The data storage device as claimed in claim 6, wherein:
when trimming data shows M numbers representing the M trimming bitmap sub-tables, the controller determines that the corresponding storage area in the non-volatile memory stores the M trimming bitmap sub-tables.

8. The data storage device as claimed in claim 7, wherein:
the host-to-device mapping table includes a plurality of mapping sub-tables; and
each mapping sub-table records mapping data, in units of the second length, of a logical address range of the first length.

9. A method for controlling a data storage device, comprising:
reconstructing trimming information of a non-volatile memory on a temporary storage device;
scanning the non-volatile memory according to a programming order to collect a sequence of trimming information flags, and interpreting a piece of storage information as a logical address or trimming data according to a corresponding trimming information flag;
in response to determining that a trimming information flag shows that a corresponding piece of storage information is a logical address, using the logical address to reconstruct a host-to-device mapping table;
in response to determining that a trimming information flag shows that a corresponding piece of storage information is trimming data, using the trimming data to determine whether a storage area in the non-volatile memory stores trimming information for medium-length trimming or for long-length trimming, wherein by the different kinds of trimming data, a management of medium-length trimming is separated from a management of long-length trimming;
in response to determining that trimming data shows that a corresponding storage area in the non-volatile memory stores trimming information for medium-length trimming, updating the host-to-device mapping table to store dummy mapping data corresponding to trimming information for medium-length trimming, to show space trimming by dummy mapping data; and
in response to determining that trimming data shows that a corresponding storage area in the non-volatile memory stores trimming information for long-length trimming, reconstructing a trimming bitmap based on trimming information for long-length trimming, wherein each bit of the trimming bitmap marks space trimming of a first length, and the trimming bitmap shows space trimming which has not yet been updated to the host-to-device mapping table as dummy mapping data.

10. The method as claimed in claim 9, wherein:
medium-length trimming does not exceed the first length and is aligned to boundaries managed in units of a second length.

11. The method as claimed in claim 10, wherein:
trimming information for medium-length trimming includes a starting logical address and a trimming length.

12. The method as claimed in claim 11, further comprising:
in response to a condition that trimming data shows medium-length trimming code, determining that the corresponding storage area in the non-volatile memory stores for medium-length trimming a starting logical address and a trimming length.

13. The method as claimed in claim 12, wherein:
long-length trimming is aligned to boundaries managed in units of the first length, and is N times the first length, and is marked by N bits of the trimming bitmap, where N is a positive integer.

14. The method as claimed in claim 13, wherein:
the trimming bitmap includes a plurality of trimming bitmap sub-tables, wherein the N bits are managed in M trimming bitmap sub-tables, and the M trimming bitmap sub-tables are regarded as trimming information for the long-length trimming, where M is a positive integer.

15. The method as claimed in claim 14, further comprising:
in response to a condition that trimming data shows M numbers representing the M trimming bitmap sub-tables, determining that the corresponding storage area in the non-volatile memory stores the M trimming bitmap sub-tables.

16. The method as claimed in claim 15, wherein:
the host-to-device mapping table includes a plurality of mapping sub-tables; and
each mapping sub-table records mapping data, in units of the second length, of a logical address range of the first length.

* * * * *